(12) United States Patent
Hotellier et al.

(10) Patent No.: US 8,978,204 B2
(45) Date of Patent: Mar. 17, 2015

(54) ELASTIC HINGE ELEMENT FOR SPECTACLES FRAME

(75) Inventors: Christophe Hotellier, Morez (FR); Pierre Bussod, La Mouille (FR); Jean-Marc Donjon, Grande Riviere (FR); Francois Mathieu, Larrivoire (FR)

(73) Assignee: Mazzucchelli International B.V., Amsterdam (NL)

( * ) Notice: Subject to any disclaimer, the term of this patent is extended or adjusted under 35 U.S.C. 154(b) by 171 days.

(21) Appl. No.: 13/122,650

(22) PCT Filed: Oct. 6, 2009

(86) PCT No.: PCT/IB2009/054376
§ 371 (c)(1),
(2), (4) Date: Apr. 5, 2011

(87) PCT Pub. No.: WO2010/041199
PCT Pub. Date: Apr. 15, 2010

(65) Prior Publication Data
US 2011/0185538 A1 Aug. 4, 2011

(30) Foreign Application Priority Data

Oct. 6, 2008 (IT) .............................. MI20080321 U
Nov. 12, 2008 (FR) ...................................... 08 06305

(51) Int. Cl.
*G02C 5/22* (2006.01)
*G02C 5/00* (2006.01)

(52) U.S. Cl.
CPC .............. *G02C 5/008* (2013.01); *G02C 5/2236* (2013.01); *G02C 5/2245* (2013.01); *G02C 5/2254* (2013.01); *G02C 2200/16* (2013.01)

USPC .......................................................... 16/228

(58) Field of Classification Search
CPC ....... G02C 5/22; G02C 5/2236; G02C 5/2218
USPC ............ 16/228, 382, 383, 355; 351/113, 153; 24/614, 615
See application file for complete search history.

(56) References Cited

U.S. PATENT DOCUMENTS 618,895 A * 2/1899 Munday ......................... 292/19
1,085,543 A * 1/1914 Collins .......................... 292/353

(Continued)

FOREIGN PATENT DOCUMENTS

EP 0 615 149 A1 9/1994
EP 0 623 837 A1 11/1994

(Continued)

OTHER PUBLICATIONS

International Search Report, dated Feb. 1, 2010, from corresponding PCT application.

*Primary Examiner* — Emily Morgan
(74) *Attorney, Agent, or Firm* — Young & Thompson

(57) ABSTRACT

An elastic hinge element for a glasses frame includes a box (100) that includes a guiding cavity (101), a slide (200) that includes a body (201) moving in the guiding cavity (101), and at least one elastic piece (204) that works with the box to produce an elastic reaction that opposes the extraction of the slide from the guiding cavity (101), in which the slide body (201) includes an inside cavity that accommodates the elastic piece. The hinge element includes a holding clip for locking a proximal end of the elastic piece relative to the box (100), with the holding clip including flexible arms that extend in a distal direction and holding element (207*a*) that work with the box (100).

26 Claims, 22 Drawing Sheets

(56) References Cited

U.S. PATENT DOCUMENTS

| | | | |
|---|---|---|---|
| 1,601,359 A * | 9/1926 | Harrington | 70/100 |
| 3,744,887 A * | 7/1973 | Dunbar | 351/153 |
| 4,351,086 A | 9/1982 | Drlik | |
| 4,408,375 A * | 10/1983 | Skobel | 24/615 |
| 4,494,834 A | 1/1985 | Tabacchi | |
| 4,689,851 A | 9/1987 | Beyer | |
| 4,713,865 A * | 12/1987 | Geldwerth | 24/616 |
| 4,991,258 A * | 2/1991 | Drlik | 16/228 |
| 5,400,090 A * | 3/1995 | Chen | 351/113 |
| 5,657,107 A | 8/1997 | Wagner et al. | |
| 5,755,010 A * | 5/1998 | Lehnert | 16/228 |
| 5,838,418 A | 11/1998 | Kanda | |
| 6,095,646 A * | 8/2000 | Montagner | 351/153 |
| 6,241,354 B1 | 6/2001 | Schuchard et al. | |
| 6,547,389 B2 * | 4/2003 | Hotellier | 351/153 |
| 6,631,194 B2 | 10/2003 | Fukuoka | |
| 6,892,422 B2 * | 5/2005 | Schuchard | 16/228 |
| 7,108,372 B2 * | 9/2006 | Li | 351/153 |
| 7,350,271 B2 * | 4/2008 | Genelot | 16/228 |
| 7,572,005 B2 * | 8/2009 | Hotellier | 351/113 |
| 8,371,692 B2 * | 2/2013 | LaGace et al. | 351/153 |
| 2002/0092960 A1 * | 7/2002 | Hotellier | 248/560 |
| 2005/0217073 A1 | 10/2005 | Wagner | |
| 2006/0126011 A1 * | 6/2006 | Chen | 351/113 |
| 2007/0089268 A1 | 4/2007 | Genelot | |
| 2008/0192199 A1 | 8/2008 | Hotellier | |

FOREIGN PATENT DOCUMENTS

| | | |
|---|---|---|
| EP | 0 632 306 A1 | 1/1995 |
| EP | 1 175 638 B1 | 7/2004 |
| FR | 2 206 513 A | 6/1974 |
| FR | 2 614 953 A1 | 11/1988 |
| FR | 2 662 516 A1 | 11/1991 |
| FR | 2 741 459 A1 | 5/1997 |
| FR | 2 793 323 A1 | 11/2000 |
| WO | 2004/040355 A1 | 5/2004 |
| WO | 2005/111701 A1 | 11/2005 |
| WO | 2005/121873 A1 | 12/2005 |
| WO | 2008/096251 A1 | 8/2008 |

* cited by examiner

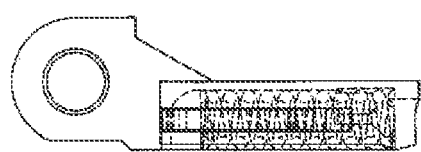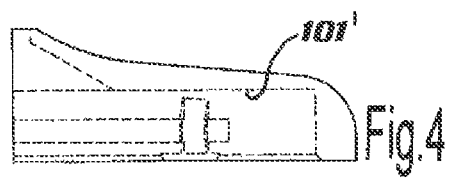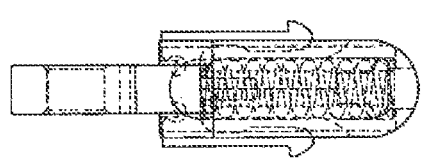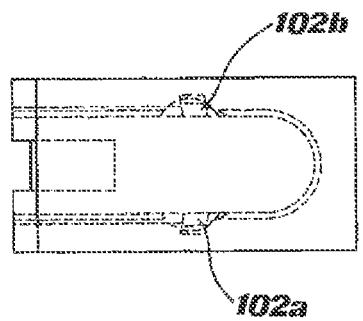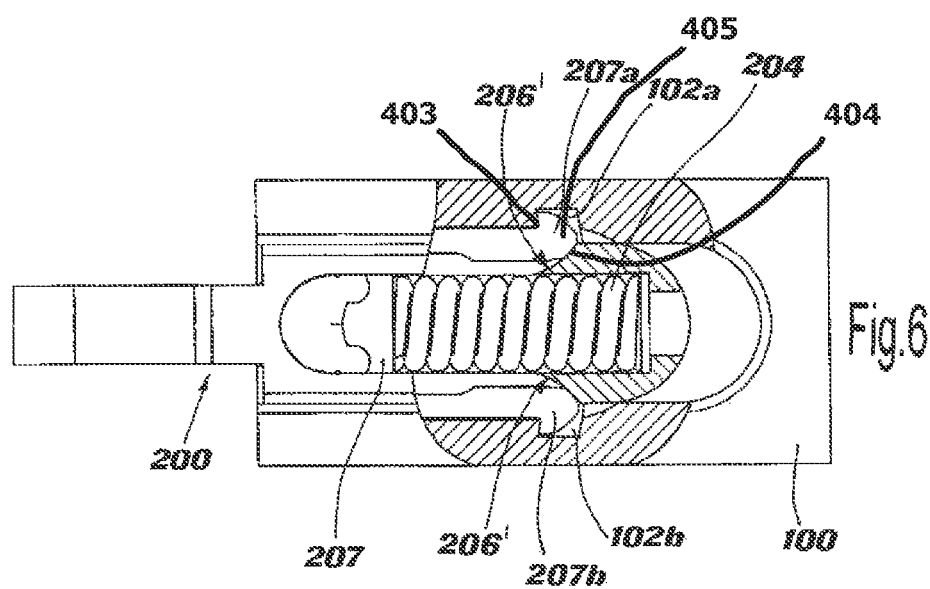

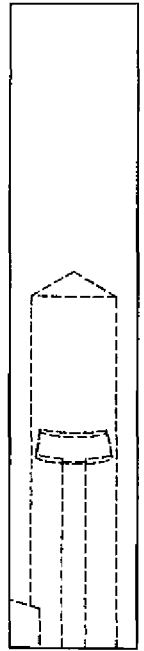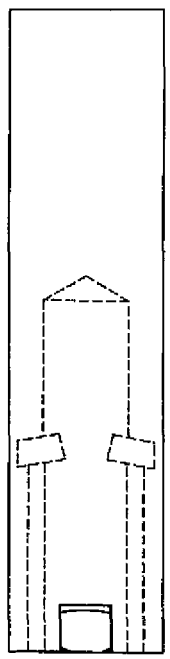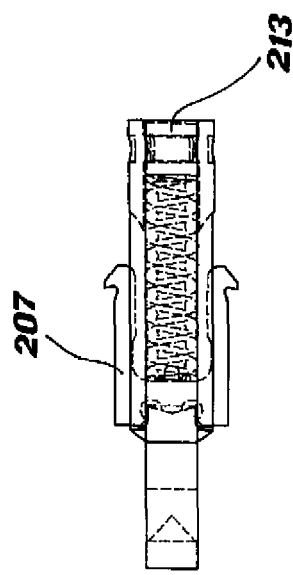

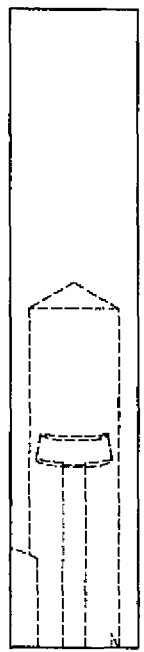
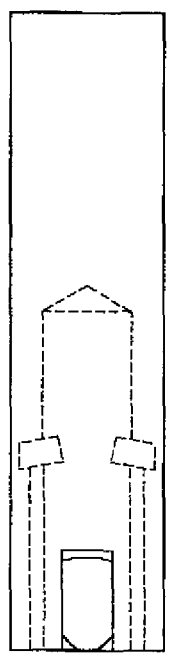
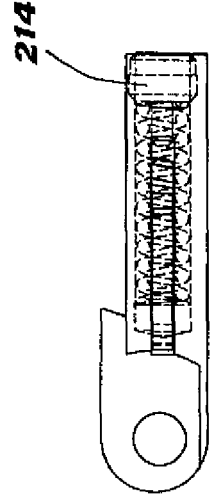
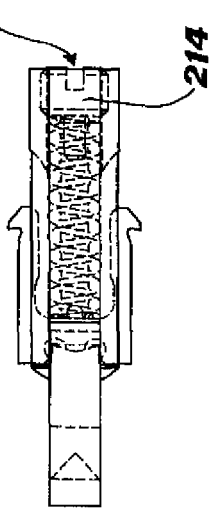

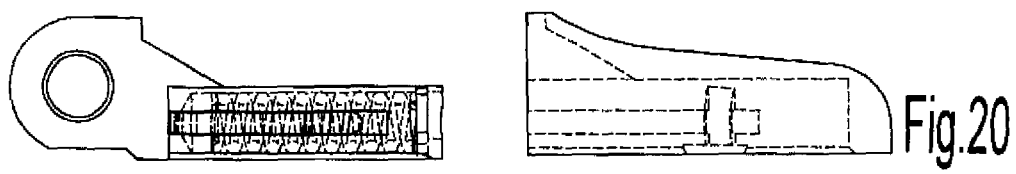
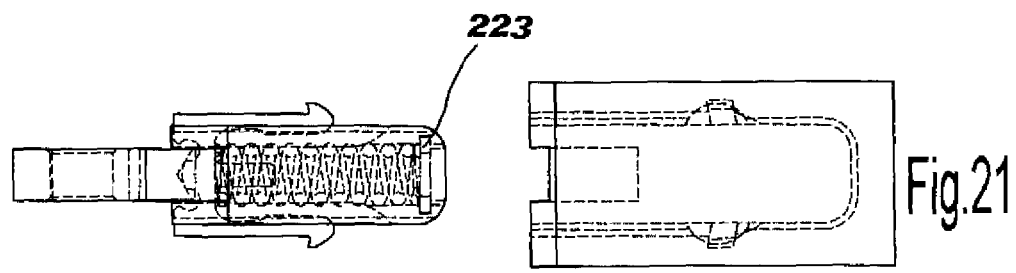

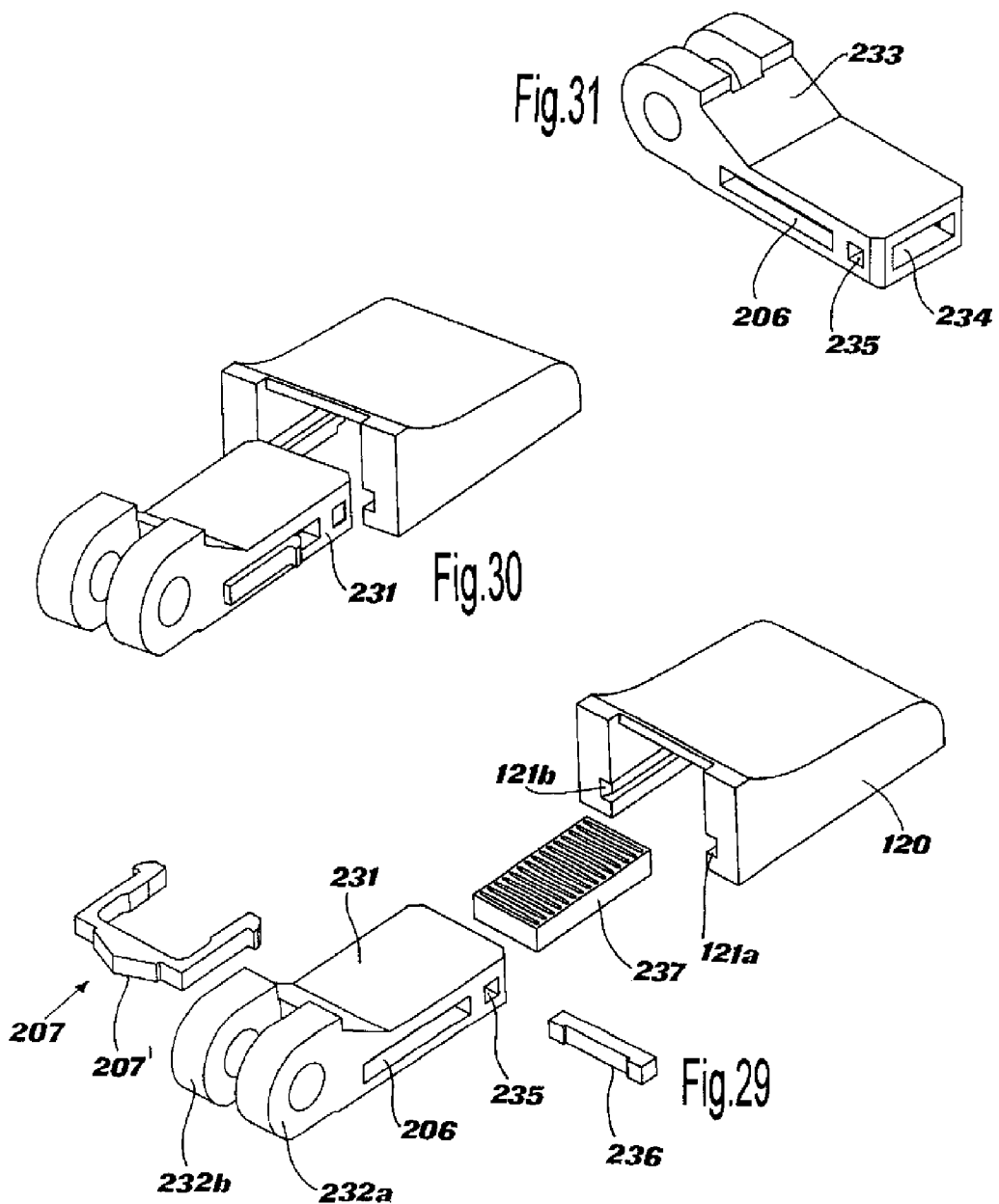

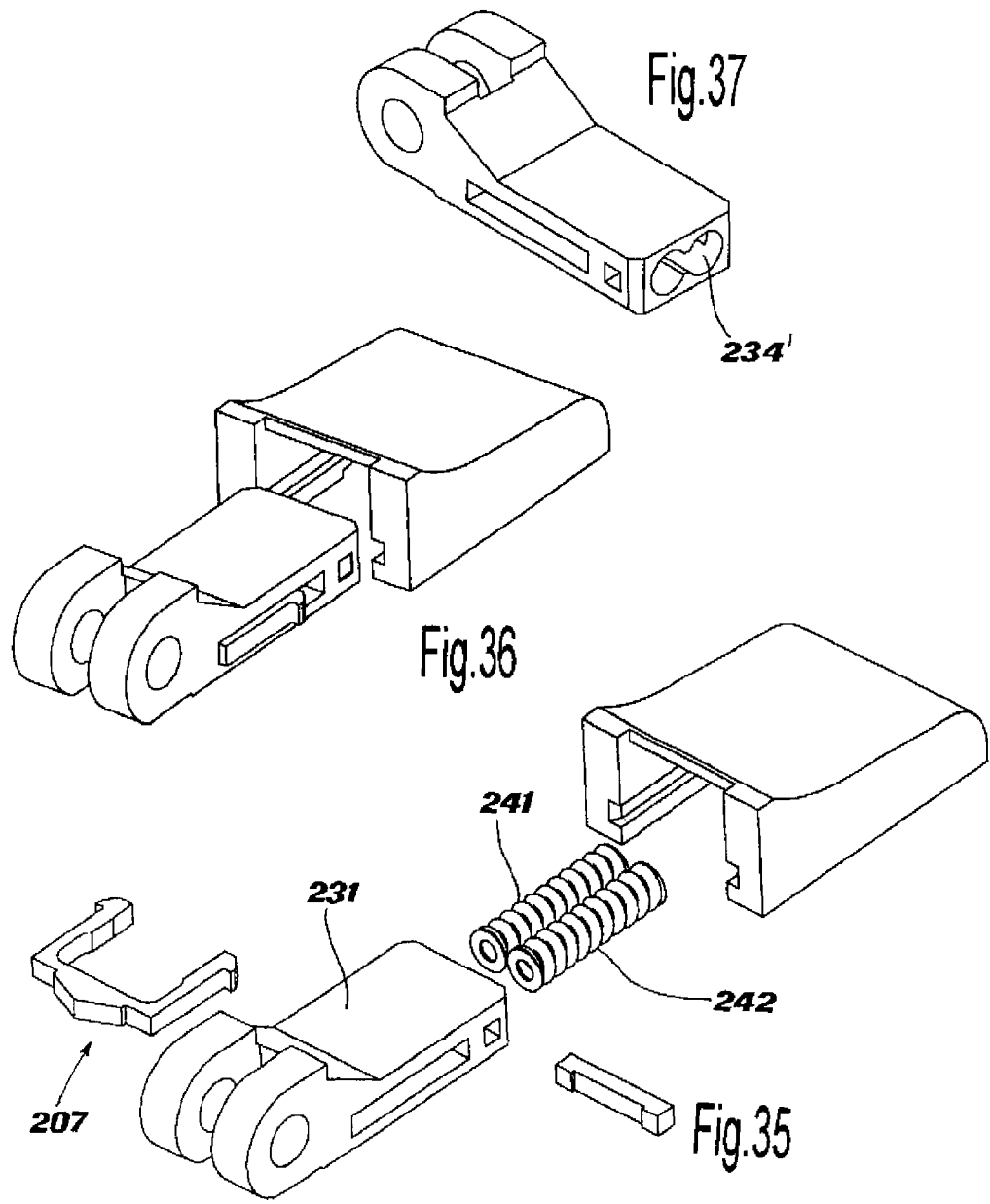

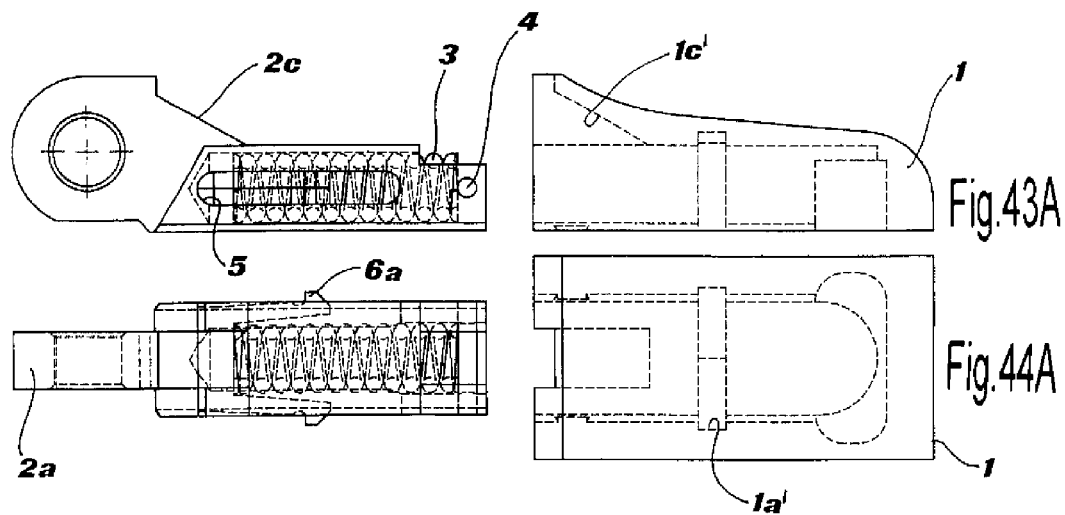
Fig. 43A
Fig. 44A
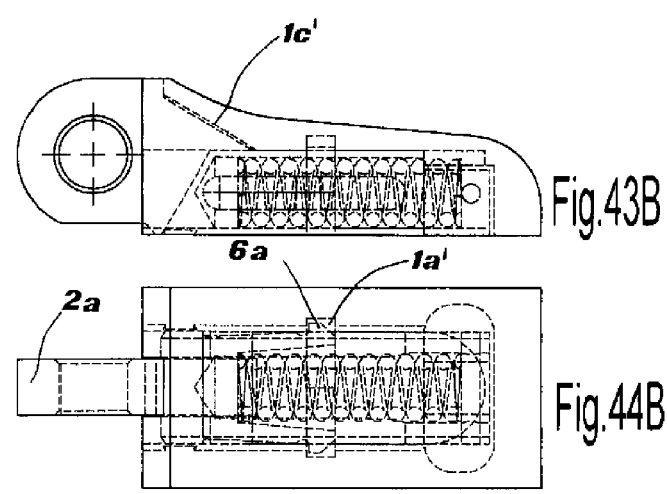
Fig. 43B
Fig. 44B

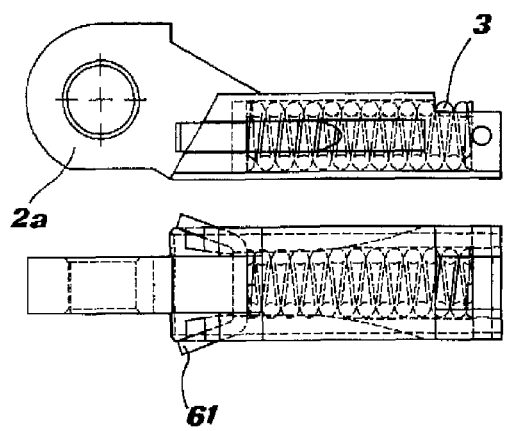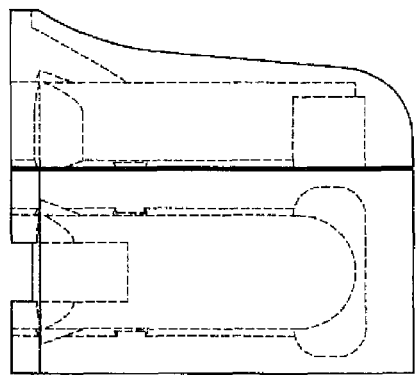
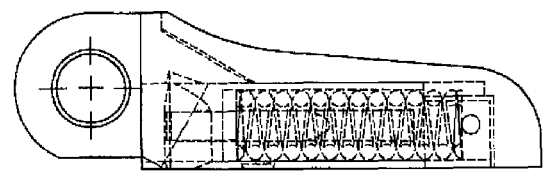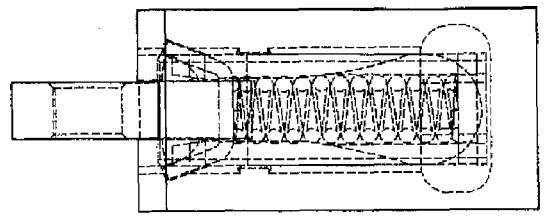

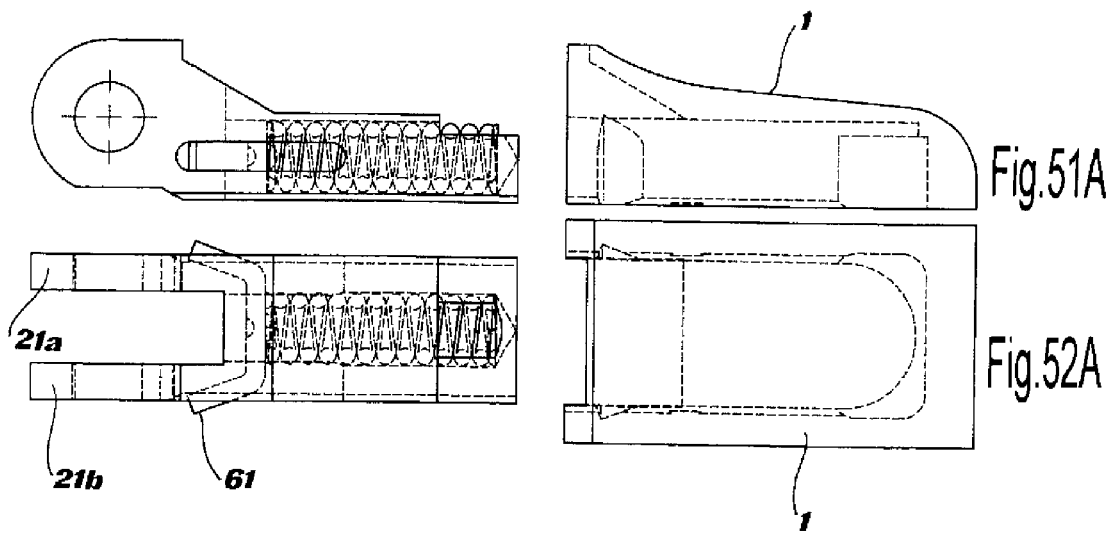

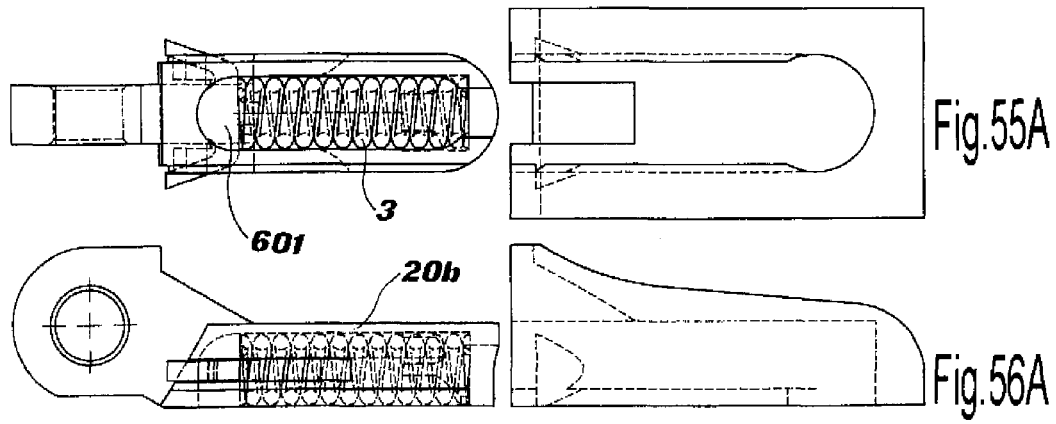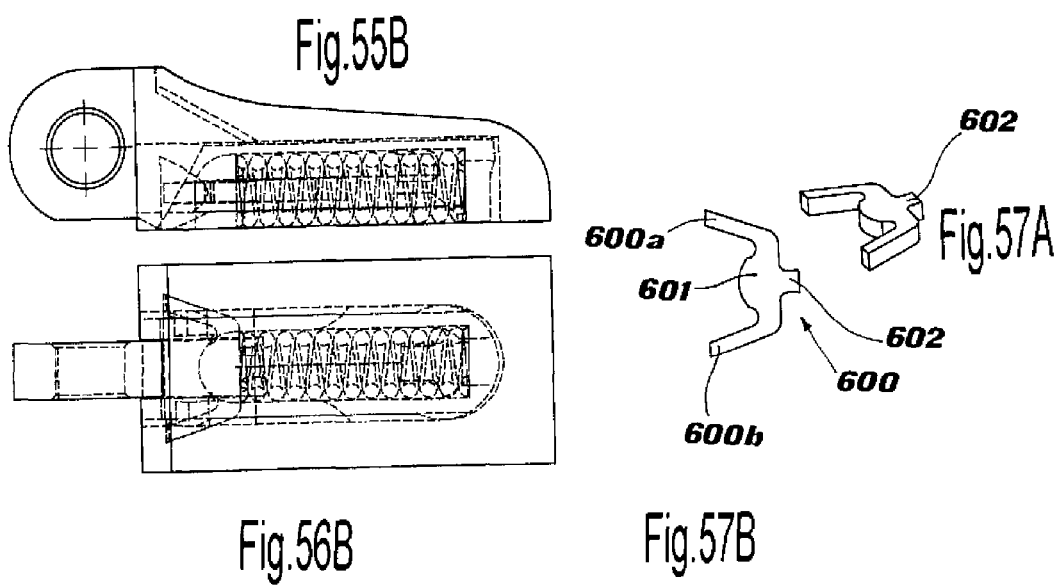

ELASTIC HINGE ELEMENT FOR SPECTACLES FRAME

BACKGROUND OF THE INVENTION

1. Field of the Invention

This invention relates to a hinge for a glasses frame and more specifically an elastic hinge.

2. Description of the Related Art

According to the known technique, the hinges of a glasses frame are mechanisms that make it possible to articulate two side arms on the glasses frame.

The hinges for a glasses frame comprise a considerable variety of forms, both in terms of functionality and in terms of the aesthetics that they should impart to the glasses. Among the hinges that are most used today, the flexible hinges comprise an elastic hinge element that is linked, by an axis of articulation, to an end piece that is provided on the glasses frame. The elastic hinge element generally comprises a box that is produced on each arm, in which a slide moves. The translational motion of the slide in the box is counteracted by an elastic piece, generally a helical spring, which imparts elasticity to the movement of the slide.

This configuration can also be reversed; this is why the end piece can be arranged on the arms and the elastic hinge element can be arranged on the glasses frame.

Examples of conventional elastic hinge elements are described in the documents EP1175638 or FR2662516 in the name of the applicant. In these hinge elements, the helical spring is slipped onto a shaft of the slide. The shaft keeps the helical spring in a good operating position, and, in contrast, it serves as a stop at the distal end of the helical spring (i.e., the rear end of the shaft, the closest to the base of the box). The other end of the spring, i.e., the proximal end, is locked by various attachment means. In this way, the translational motion of the slide element compresses the spring that then produces the desired elastic reaction.

These hinges pose certain problems owing to the thinness of the shaft that accommodates the spring (which must support the entire traction load of the slide element) and owing to manufacturing problems. In addition, since it is not possible to obtain exact tolerances on the length of the spring, for producing a precise guiding of the slide in the box, it is necessary to provide—in the proximal part of the slide— special guide portions that are added to the length of the shaft that bears the spring and that impose a minimum longitudinal dimension on the mechanism.

Hinges have already been proposed with a helical spring that is not slipped onto an elongated shaft but is rather contained between the two lateral portions of the U-shaped body of the slide element. Examples of said hinges are described in the documents EP0632306 and EP0615149.

These hinges pose other problems, however. In particular, the helical spring is neither well contained nor well supported, to the point that in some cases—for example U.S. Pat. No. 4,351,086—a central holding shaft is also provided to prevent any undesirable deformation that would compromise the operation; furthermore, the body of the sliding element retains either a certain lateral flexibility or a low torque resistance, which do not make it possible to obtain a suitable rigidity so that the sliding inside the box is precise, especially under stress.

Likewise, the configurations that are thus far proposed do not make it possible to use simple clips for holding the slide in the box—as is the case, by contrast, with the conventional slides—and it is consequently necessary to provide complex assembly systems, as illustrated in, for example, the documents U.S. Pat. No. 6,631,194 and FR2206513.

Finally, in some cases, the slide moves into its box in direct contact with the raised edge of the arm on which it is soldered, which brings about problems of soldering the hinge and guiding precision of the slide.

BRIEF SUMMARY OF THE INVENTION

Thus, it may be desired to resolve the above-mentioned drawbacks by providing an elastic hinge element that has high strength both in traction and in torque, equipped with few elements that are easy to assemble. It may also be desired to provide an elastic hinge element that can house with precision one or more elastic pieces, not necessarily in the form of a helical spring, which are quite delimited laterally in such a way as not to cause deformations that could compromise its good operation and duration. Likewise, it may be desired to provide a hinge slide that can be made economically, in particular by removing chips and, if possible, also with non-ferrous materials.

Finally, it may also be desired to provide a greater rigidity and a greater guiding precision of the slide in its box.

Embodiments of the invention relate to an elastic hinge element for a glasses frame that comprises: a box that comprises a guiding cavity, a slide that comprises a body moving in the guiding cavity, and at least one elastic piece that works with the box to produce an elastic reaction that opposes the extraction of the slide from the guiding cavity, in which the slide body comprises an inside cavity that accommodates the elastic piece and that comprises a holding clip to lock a proximal end of the elastic piece relative to the box, with the holding clip comprising flexible arms 401, 402 that extend in a distal direction and holding means that work with the box.

According to one embodiment, the slide body comprises slots made on opposing sides of the latter, walls of the guiding cavity comprise longitudinal grooves, and the flexible arms of the holding clip engage in the slots of the slide body and in the longitudinal grooves of the guiding cavity to ensure the guiding of the slide in the box.

According to one embodiment, the length of the slots is greater than that of the arms.

According to one embodiment, the holding means of the holding clip comprise lugs that are arranged on the flexible arms and that are provided for fitting into transverse recesses made on the walls of the guiding cavity.

According to one embodiment, the lugs are equipped with anchoring angles 403.

According to one embodiment, the lugs have an inclined surface 404 and are designed to act as an end-of-travel stop by resting on the end portions of slots, with the inclined surfaces making it possible to use a longitudinal traction force to lock the lugs by compression in their transverse recesses of the guiding cavity.

According to one embodiment, the lugs are designed to engage in the end portions of the slots that are shaped with a connecting elbow 405 that serves to transform a longitudinal traction on the slide into a pressure action of the lugs toward the respective transverse hollows of the guiding cavity.

According to one embodiment, the clip is obtained from a thin metal plate.

According to one embodiment, the clip has essentially a U shape or a non-symmetrical H shape.

According to one embodiment, the box that is equipped with the guiding cavity is in the form of a base and the clip holds the slide in the base to allow an assembled delivery of the hinge element before mounting the hinge element on a support.

According to one embodiment, the slide body is essentially in the shape of a prismatic, cylindrical or truncated cylindrical elongated box, and the inside cavity of the slide body has a suitable shape for accommodating the elastic piece with precision.

According to one embodiment, the slide body has a width that is at least double its height.

According to one embodiment, the slide body is manufactured by injection of polymer material, by injection of plastic material, or by molding and injection of metal.

According to one embodiment, the slide comprises at least one pierced link (202) that makes it possible to articulate with a hinge end piece.

According to one embodiment, the elastic piece comprises a helical spring or a pair of helical springs that are placed side by side.

According to one embodiment, the elastic piece comprises a solid or alveolar elastomer material.

According to one embodiment, the elastic piece is integral with the elastic clip, and the two elements form a single piece.

According to one embodiment, the unit consisting of the elastic piece and the elastic clip is obtained by cutting out a thin metal plate.

According to one embodiment, the slide body comprises at least one opening for inserting the elastic element.

According to one embodiment, the elastic element rests on a distal part of the slide body.

According to one embodiment, the distal part of the slide body on which the elastic piece rests comprises one of the following elements: a pin, a screw, a tightened or soldered end piece, and a ring or an elastic plate.

Embodiments of the invention also relate to a process for manufacturing an elastic hinge element for a glasses frame, whereby the hinge element comprises a box that comprises a guiding cavity, a slide that comprises a body that moves into the guiding cavity, and at least one elastic piece that works with the box to produce an elastic reaction that opposes the extraction of the slide from the guiding cavity, whereby the process comprises the stages that consist in: providing an inside cavity in the slide body, producing a holding clip for locking a proximal end of the elastic piece relative to the box, with the holding clip comprising flexible arms that extend in a distal direction and holding means that work with the box, arranging the elastic piece in the inside cavity, and arranging the holding clip in the elastic hinge element.

According to one embodiment, the process comprises stages that consist in: providing slots on opposing sides of the slide body, providing longitudinal grooves on the walls of the guiding cavity, and arranging the holding clip in the slide element in such a way that the flexible arms of the holding clip engage in the slots of the slide body and in the longitudinal grooves of the guiding cavity to ensure the guiding of the slide in the box.

According to one embodiment, the process comprises the stages that consist in: providing lugs on the flexible arms of the holding clip, providing transverse recesses on the walls of the guiding cavity, and arranging the holding clip in the slide element in such a way that the lugs fit into the transverse recesses.

According to one embodiment, the clip is produced from a thin metal plate.

According to one embodiment, the clip is produced in such a way as to have essentially a U shape or a non-symmetrical H shape.

According to one embodiment, the box that is equipped with the guiding cavity is produced in the form of a base and comprises a stage for mounting the slide in the base and holding the latter by means of the elastic clip, followed by an assembled delivery stage of the hinge element before the mounting of the latter on a support.

According to one embodiment, the slide body is shaped in the form of a prismatic, cylindrical or truncated cylindrical elongated box, the inside cavity of the slide body is produced in such a way as to have a suitable shape for accommodating the elastic piece with precision, and at least one opening is provided in the slide body for inserting the elastic element.

According to one embodiment, the slide body is manufactured by injection of polymer material, by injection of plastic material, or by molding and injection of metal.

According to one embodiment, the slide is produced in such a way as to have at least one pierced link that makes it possible to articulate with a hinge end piece.

According to one embodiment, the elastic piece is produced from a helical spring or a pair of helical springs that are placed side by side.

According to one embodiment, the elastic piece is produced from a solid or alveolar elastomer material.

According to one embodiment, the elastic piece and the elastic clip are produced from a single part.

According to one embodiment, the unit of the elastic piece and the elastic clip is obtained by cutting out a thin metal plate.

According to one embodiment, the process comprises a stage for the production, on a distal part of the slide body, of the elastic element from a support element, starting from one of the following elements: a pin, a screw, a tightened or soldered end piece, a ring or an elastic plate.

BRIEF DESCRIPTION OF THE DRAWINGS

These characteristics will be better understood from reading the following description of embodiments of elastic hinge elements according to the invention, given in a nonlimiting way with reference to the accompanying drawings among which:

FIG. 4 is a lateral elevation view, partially transparent, of the box and the slide of FIG. 1;

FIG. 5 is a top plan view, partially transparent, of the box and the slide of FIG. 1;

FIG. 6 is a partial-cutaway bottom plan view of the assembled hinge element of FIG. 1;

FIGS. 7-11 are views that are analogous to those of FIGS. 1-5 of a second embodiment of the invention;

FIGS. 12-16 are views that are analogous to those of FIGS. 1-5 of a third embodiment of the invention;

FIGS. 17-21 are views that are analogous to those of FIGS. 1-5 of a fourth embodiment of the invention;

FIGS. 29-31 are views that are respectively in perspective and exploded of two components that are ready for assembly and that have a single slide, according to a seventh embodiment of the invention;

FIGS. 35-37 are views that correspond to FIGS. 29-31 of an eighth embodiment of the invention;

FIG. 43A is a partial-cutaway, lateral elevation view of the detached box and slide of FIG. 41;

FIG. 43B is a view that is analogous to that of FIG. 43A with the two coupled components;

FIGS. 44A and 44B are partial-cutaway, respective plan views of the elements of FIGS. 43A and 43B;

FIGS. 45-48B are views that are analogous to those of FIGS. 41-44B of a variant of the hinge of the invention, with a compression clip;

FIGS. 49-52B are views that are analogous to those of FIGS. 41-44B of another variant of the hinge, with a compression clip and a double eyelet head clip;

FIGS. 53-56B are views that are analogous to those of FIGS. 41-44B of another variant of the hinge according to the model, with a compression clip and a spring that is inserted from the side; and FIGS. 57A and 57B are respectively perspective and plan views of a compression clip that is used as an example.

DETAILED DESCRIPTION OF THE PREFERRED EMBODIMENTS

Figure 1:
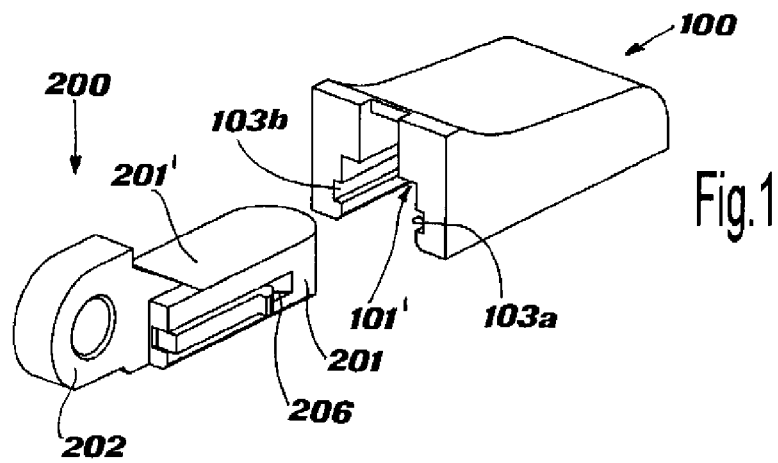
FIG. 1 is a top view and lateral perspective view of a box and a moving slide of a hinge element according to a first embodiment of the invention.

FIG. 1 illustrates the two primary components of an elastic hinge element. In a conventional way, there are provided, on the one hand, a box 100—designed here to be attached to a support, for example on the raised edge of a glasses arm (not shown)—and, on the other hand, a movable slide 200.

The slide has a body 201 and a link 202 extending the body 201. The link 202 is designed to be assembled, by means of an axis of articulation (not shown), with a hinge end piece, for example a U-shaped female element, to form a complete hinge.

The box 100 has a guiding cavity 101 into which the slide 200 can be inserted and can move in length. According to the embodiment of FIG. 1, the box 100 is shown open on the lower side, but before mounting the hinge element on the glasses (by soldering), it can be closed by means of a closing strip (not shown).

In one embodiment, the slide body 201 has, for example, a hollow prismatic shape and forms a type of box. According to the embodiment that FIGS. 1-5 illustrate, the body 201 of the slide 200 is essentially a rectangular parallelepiped, with a width that is greater than that of the link 201. In addition, the slide body 201 has a recess 203' that can house with precision an elastic piece 204 in the form of a helical spring. The recess 203 extends along the longitudinal axis of displacement of the slide 200 and extends over the entire length of the body 201 up to the zone for connection with the link 202.

To lock the spring 204 in the direction of the length, shoulders of the end stop 205' and 205" were provided on the bottom of the recess 203, and an elastic holding clip 207 was partially inserted into two slots or openings 206 on two opposing sides of the body 201. The holding clip 207 has a flat shape here and comprises two flexible arms that extend in a distal direction (i.e., toward the rear end of the hinge element, in the direction of the bottom of the guiding cavity), and a central part that forms a base of the clip and connects the two flexible arms. The clip is essentially U-shaped or, as shown, essentially in the shape of a non-symmetrical H, with proximal endings of the arms that extend essentially beyond the base.

The clip 207 is inserted into the body 201 with the base rotated toward the link 202 and the two arms rotated toward the distal end of the slide 200. According to one aspect of the invention, the two flexible and opposing arms of the clip 207 enter with precision into the two slots 206 and partially emerge again therefrom. According to the embodiment that is shown, the two arms end by holding lugs 207a and 207b that have a beveled inclined acute angle on the side that is rotated toward the distal end of the slide 200.

The surfaces of the clip 207 have a good surface evenness such that the arms can slide with precision into the slots 206, themselves made with upper and lower planes that are parallel to one another and that can guide the arms of the clip 207 with precision.

Figure 2:
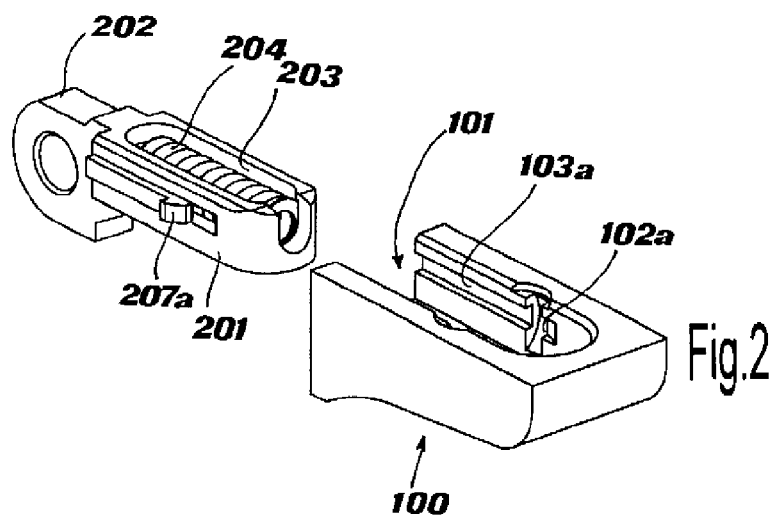
FIG. 2 is a bottom view and lateral perspective view of the box and the slide of FIG. 1.
Figure 3:
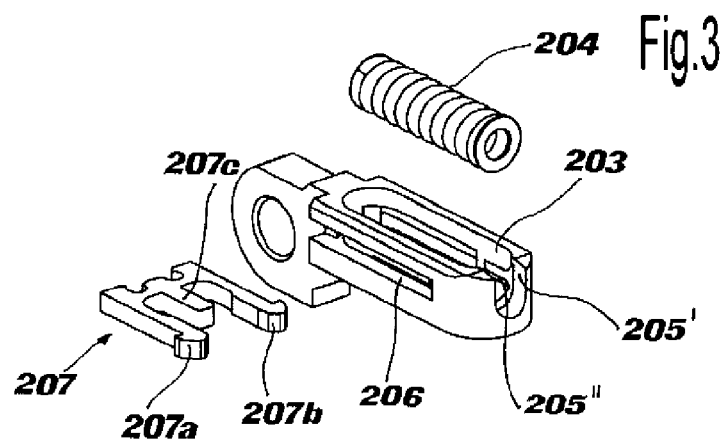
FIG. 3 is an exploded view of the moving slide of FIG. 1.
Figure 7:
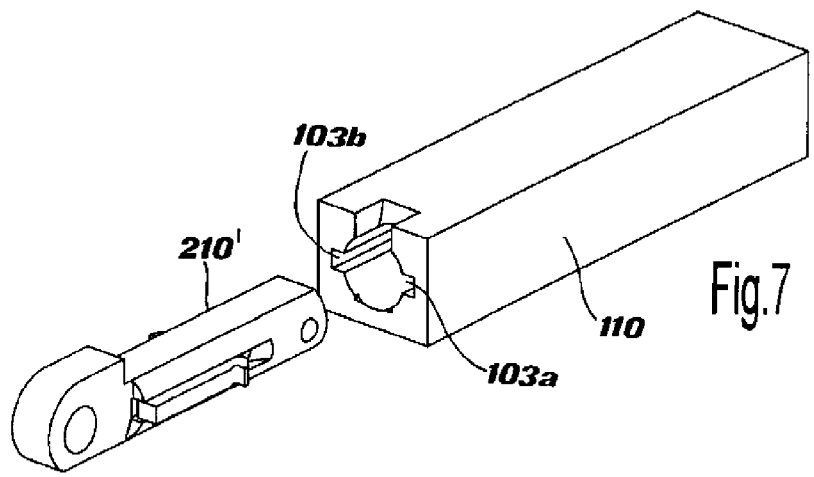
Figure 8:
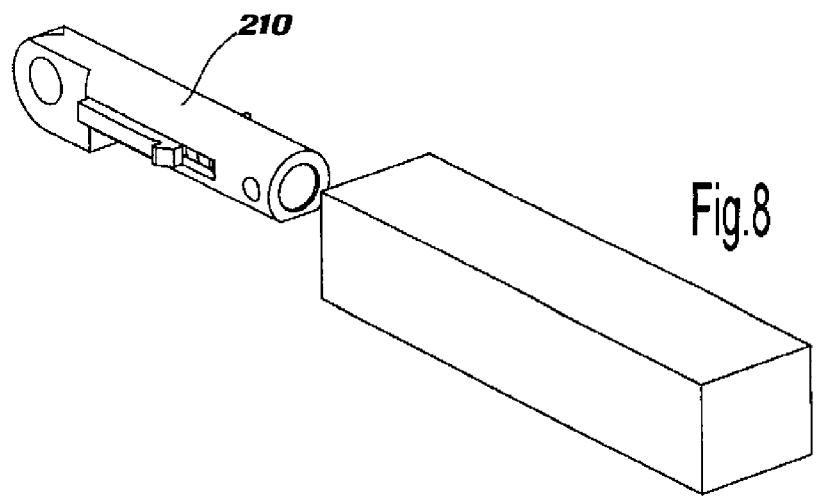
Figure 9:
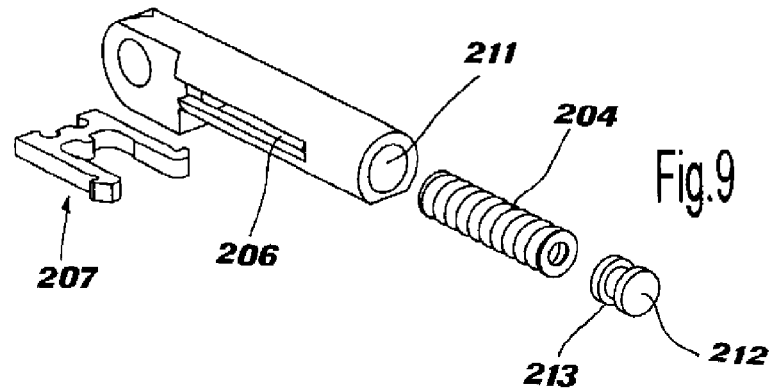
Figure 12:
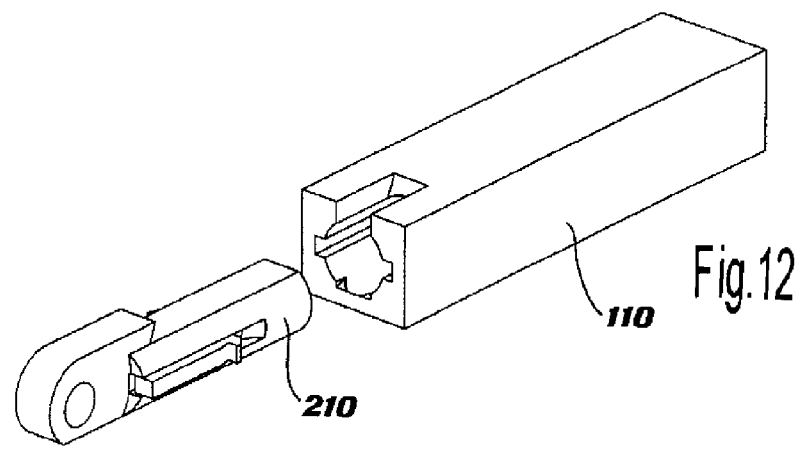
Figure 13:
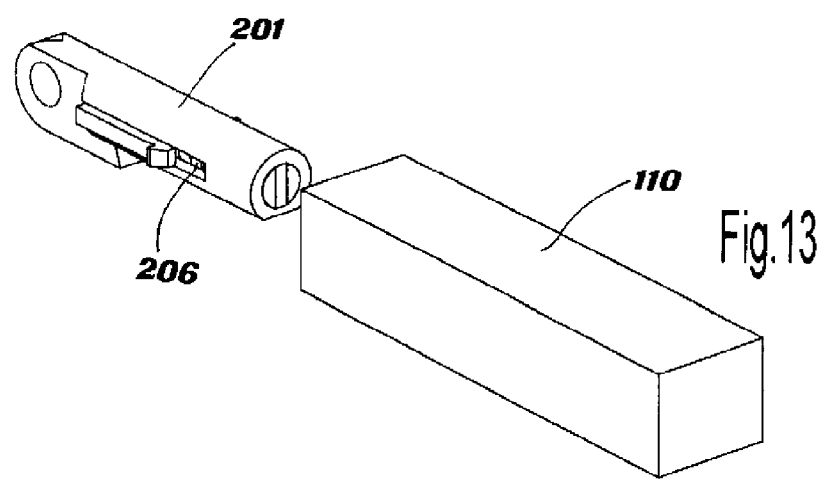
Figure 14:
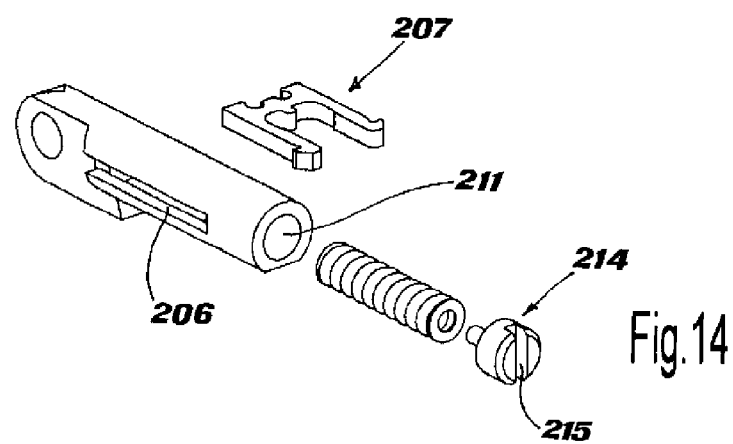
Figure 17:
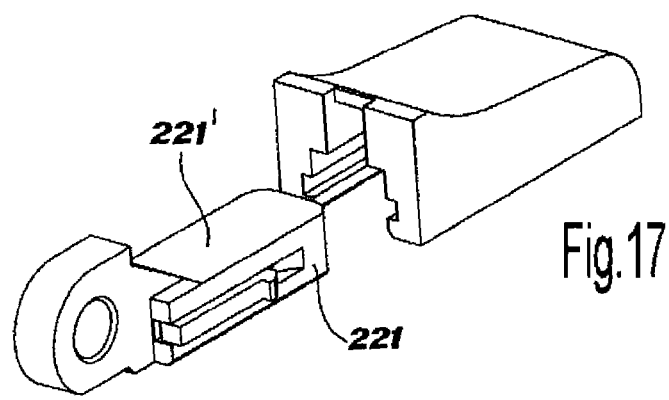
Figure 18:
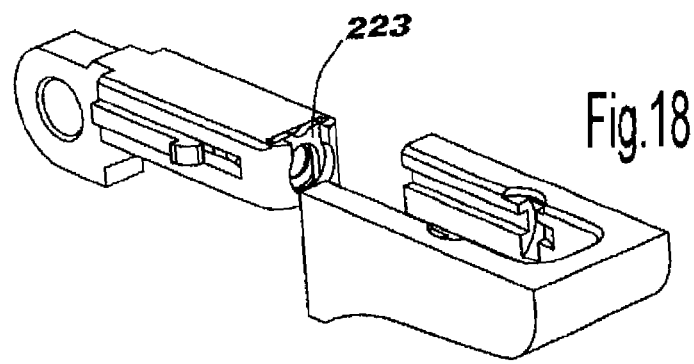
Figure 19:
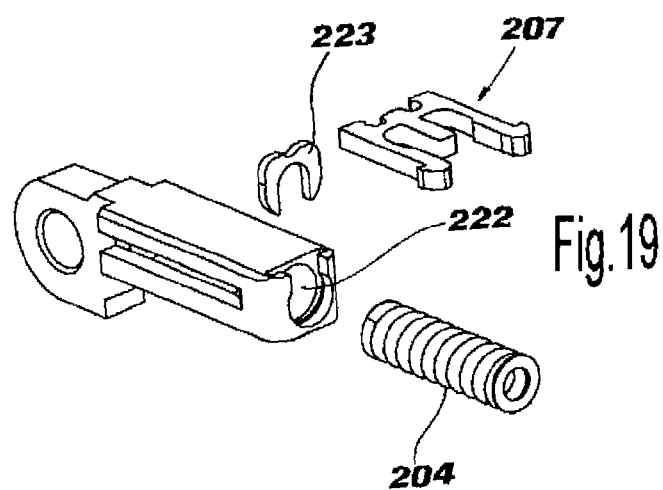
Figure 22:
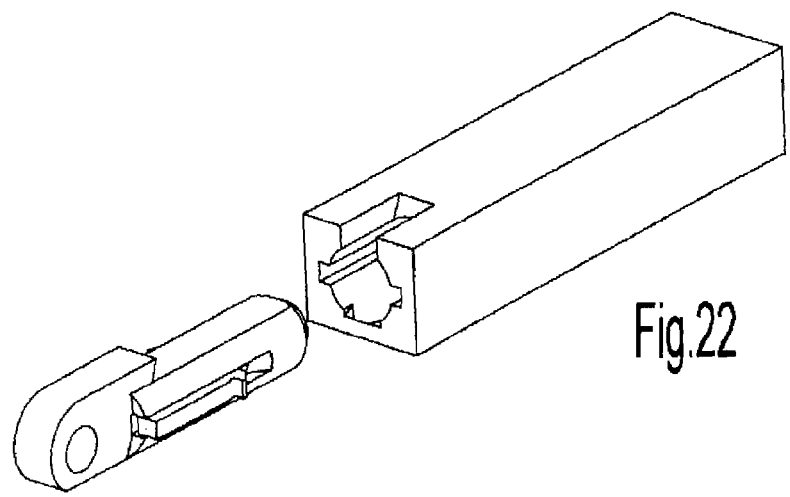
FIGS. 22-26 are views that are analogous to those of FIGS. 1-5 of a fifth embodiment of the invention.

The lengths of the slots 206 are at least greater than the lengths of the arms of the U-shaped foot 207, so as to be able to insert the latter transversally into the cavity in the respective operating position (FIG. 2). As is shown, the slots 206 can even have a greater length to allow the longitudinal movement of the slide relative to the clip 207 that is designed to remain locked—once the hinge element is assembled—in the box 100.

Preferably, the clip 207 also has a small central rod 207c, parallel to the flexible arms, designed to enter into the hole of the core of the spring 204, to obtain a more stable assembly.

To be able to couple the clip 207 in the box 100 as desired, the guiding cavity 101 has two opposing transverse recesses 102a and 102b and two opposing longitudinal grooves 103a and 103b.

The recesses or hollows 102a and 102b are designed to house and to hold the terminal lugs 207a and 207b of the arms of the clip 207 in such a way as to lock the clip relative to the box 100.

The two longitudinal grooves 103a and 103b are provided for performing two primary functions: on the one hand, serving as the casing slide with lugs 207a and 207b during the insertion of the slide 200 into the box 100, and, on the other hand, serving as support to the arms of the clip 207, once the hinge element has been assembled.

The coupling of the clip arms 207 and grooves 103a and 103b ensures excellent holding and excellent longitudinal and transverse stability of the clip 207 relative to the box 100. This is reflected in the possibility of perfectly guiding the slide 200—which moves longitudinally, guided with precision by the arms of the clip 207—relative to the box 100.

For this purpose, the arms of the clip have a sufficient length for guiding and holding the slide in the box 100. For example, the portion of the arms that enters into the slots 206 is at least equal to 3 mm, preferably at least 4 mm.

In other words, the body of the slide 201 moves with precision relative to the box 100 using the moving engagement of the slots 206 on the arms that are locked relative to the box 100.

The mounting tolerance is therefore established between the support planes of the arms of the clip 207—either relative to the slots 206 or relative to the grooves 103a and 103b—as well as between the upper surface 201' of the body 201 and the upper surface 101' of the guiding cavity 101.

In this way, the slide 200 is as if "suspended" while being movable in the box 100, and it is therefore not necessary to produce the slightest precision coupling on the lower side of the hinge element, i.e., between the lower side of the slide 200 and the cover of the box or the support that accommodates the hinge element, for example a support edge of a glasses arm.

During the mounting phase of the slide 200, the clip 207 is simply inserted inside for the recess 203 through the slots 206; next, the spring 204 is inserted by slipping it onto the shaft 207c and by pushing it all the way against the shoulders 205' and 205". In this way, it is possible to assemble a complete and independent slide 200 without having to use other components that should be combined with the box 100.

To complete the assembly of the hinge element, it is sufficient to insert the complete slide into the cavity 101 via the opening of the latter, by making it slide with the arms of the clip 207 guided along the grooves 103a and 103b. Advantageously, this operation can also be implemented after having attached or soldered the box 100 onto the support of the hinge element, for example a glasses arm.

During this insertion phase, the holding lugs 207a and 207b enter into contact with the bottom of the guiding grooves and, owing to the bevel of the acute angle, are pushed to partially reenter the slots 206 by overcoming the elastic thrust of the arms of the clip 207 whose fork tends to reclose.

Once the slide 200 is completely inserted into the cavity 101, the holding lugs 207a and 207b can emerge—owing to the elasticity of the arms of the clip 207—to become housed in the transverse hollows 102a and 102b. The coupling of the holding lugs in the hollows 102a and 102b then prevents the extraction of the clip from the box 100.

As the cutaway of FIG. 6 clearly shows, it is necessary to note that the terminal part of the slots 206 advantageously has an arched connection 206'. At the same time, the head at the end of the lugs 207a and 207b has an opportunely rounded point, in the shape of a mushroom cap that tends to assume, on the inner side, the connection 206'.

This special configuration makes it possible to produce the effect that is described below.

If the slide 200 is partially extracted from its box 100—for example when the glasses arms move too far relative to their normal opening position—the clip 207 remains locked in the box 100, and, consequently, the spring 204 is compressed, determining an elastic reaction that opposes the extraction.

The end of travel of the slide is verified when the end connections 206' stop against the mushroom top of the lugs 207a and 207b. Owing to the fact that the coupling surfaces are inclined relative to the axis of longitudinal displacement of the slide 200, a subsequent extraction traction is reflected by a transverse thrust on the lugs 207a and 207b, which consequently enter with more force into the transverse recesses 102a and 102b. Nevertheless, the extraction tension subsequently reinforces the locking of the clip 207 in the box by ensuring the impossibility of a complete extraction.

In addition, advantageously, the stop of the ends 206' on the lugs 207a and 207b defines a determined end-of-travel position of the slide and thus prevents the spring 204 from being able to be compressed into a block.

FIGS. 7-11 illustrate a second embodiment of the invention.

The latter presents a configuration that is completely analogous to that of the first embodiment. In this case, however, the body of the slide 210 is essentially cylindrical in shape. Here, the slide body has an upper flat surface 210' or a truncated cylindrical shape.

The guiding cavity in the box 110 has a corresponding shape. The box 110 forms a type of completely closed box except for the insertion opening of the slide. With this cutaway shape of the slide body, the quantity of material to be removed to obtain the guiding cavity in the box 110 is minimal, which makes it possible, for example, to produce the hinge element directly in the material of a glasses arm.

In one embodiment, the slide 210 can be obtained from a solid piece, and the recess 211 for housing the spring 204 can be made by simple piercing. The spring is then inserted in the direction of the length by the opening hole of the recess 211. To lock the spring in position, against the base of the clip 207, a small cylindrical cover 212, equipped with a circumferential groove 213, is provided. This small cover can be locked at the open end of the slide body 210—consequently acting as a stop for stopping the spring 204—by means of rods (not illustrated) that pass through the wall of the body 210 and enter into the groove 213.

The slots 206, such as with the preceding embodiment, can, for example, be obtained by milling.

The cross-section of the slide 200 has an essentially circular shape here, and the rotation over the longitudinal axis is prevented by the presence of the arms of the clip 207, which couple with precision in the longitudinal grooves 103a and 103b of the guiding cavity.

FIGS. 12-16 illustrate a third embodiment of the invention.

The latter presents a configuration that is completely analogous to that of the second embodiment. In this case, however, the small cover for closing the cavity 211 is in the form of a threaded cylindrical grain 214.

Preferably, the grain has a diametric notch 215 for being able to engage a tool, such as a screwdriver, there.

The grain is designed to be screwed onto the thread that is produced on the open end of the slide body 210, as clearly illustrated by FIGS. 15 and 16.

FIGS. 17-21 illustrate a fourth embodiment of the invention.

The latter has a configuration that is analogous to that of the first embodiment. In this case, however, the slide body 221 is not open on the lower side and is preferably obtained from the solid, by making—by longitudinal piercing—a cavity 222 that is to house the spring 204.

The spring 204 is therefore to be inserted in the direction of the length, as in the second embodiment.

The end stop element of the spring 204 consists of a ring, such as Seeger 223, engaged beside the opening of the cavity 222, which it partially obstructs in such a way as to prevent the spring 204 from freely extending.

FIGS. 22-26 illustrate a fifth embodiment of the invention.

The latter has a configuration that is analogous to that of the second embodiment. In this case, however, the element for closing the cavity 211, which also serves as an end stop for the spring 204, is obtained by plastic deformation of the slide body 231.

In particular, a small circular cover 232 is placed on a cylindrical terminal part 231' of the body 231 after having mounted the spring 204 and the clip 207 in the slide. The small cover 232 is inserted far enough down to be able then to deform plastically the periphery of the end segment 231' against and behind the small cover 232.

Figure 23:
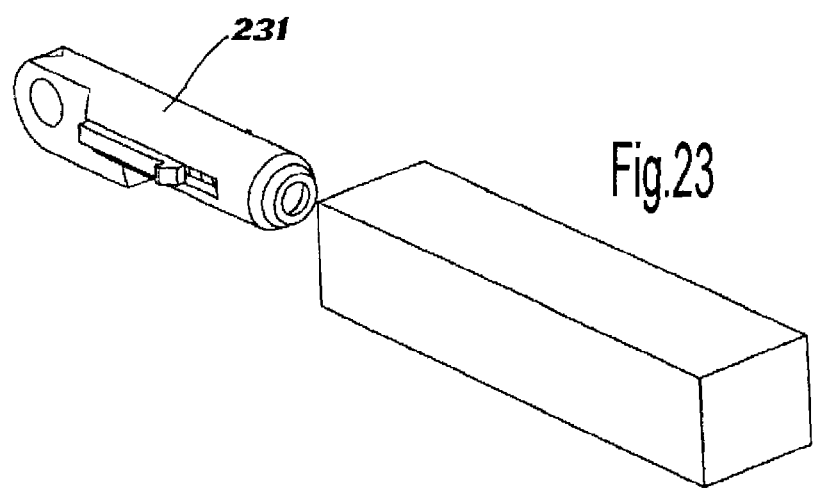
Figure 24:
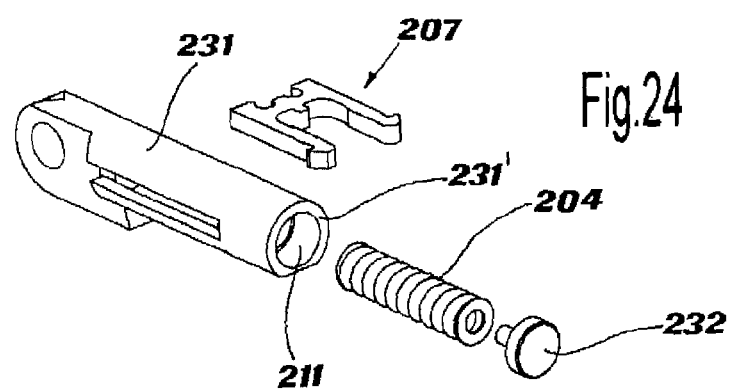
Figure 25:
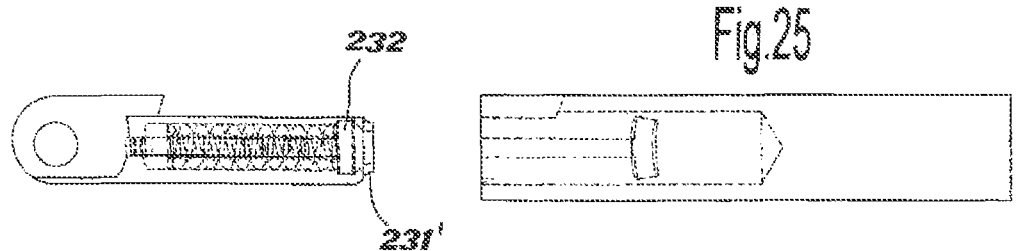
Figure 26:
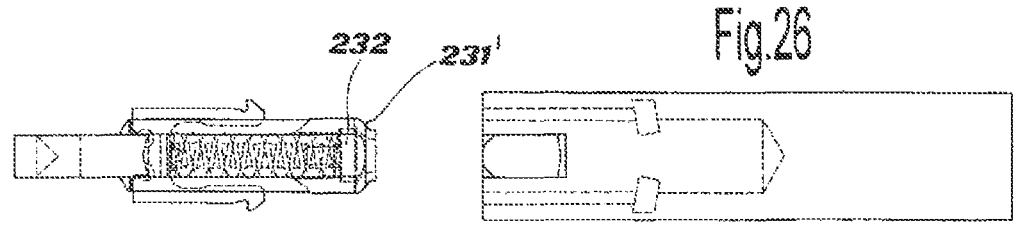

The closed end of the slide body 231 appears as is clearly illustrated in FIGS. 23 and 25-26.

Figure 28:
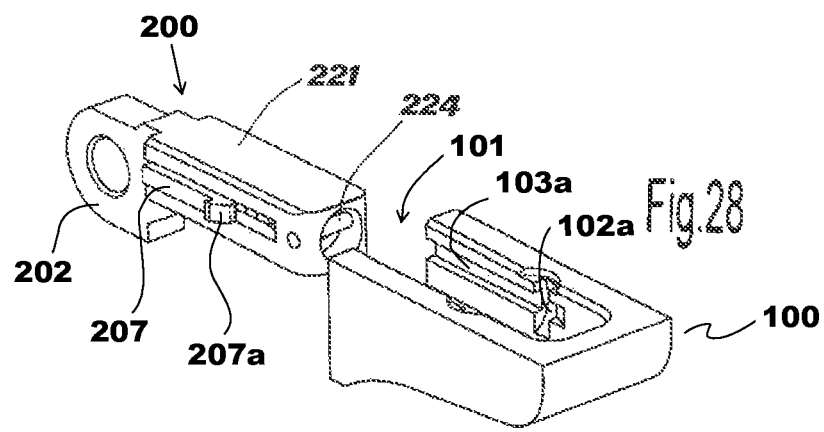
FIGS. 27-28 are views that are analogous to those of FIGS. 2-3 of a sixth embodiment of the invention.
Figure 27:
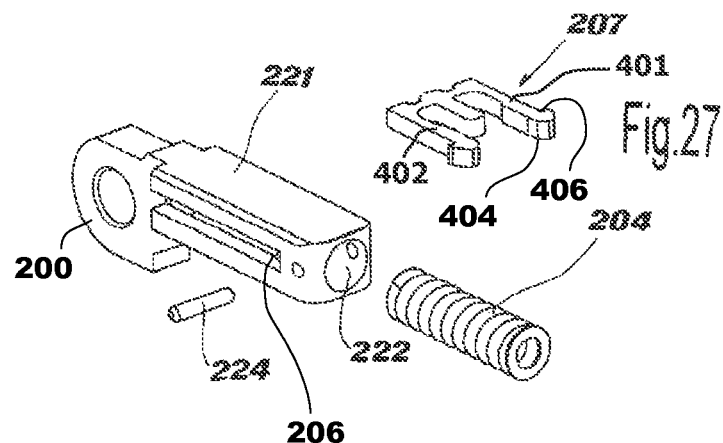
Figure 32:
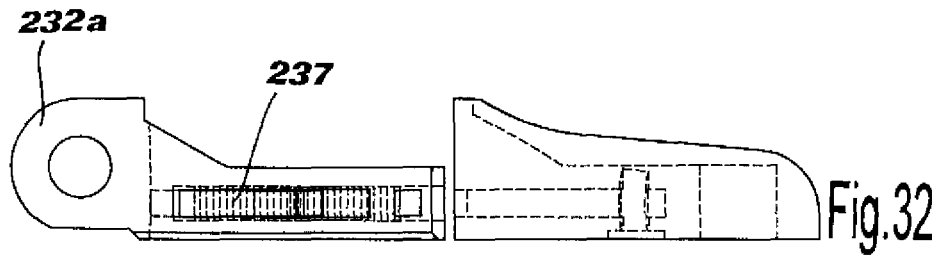
FIGS. 32-33 are lateral elevation and top plan views, partially transparent, corresponding to FIG. 30.
Figure 33:
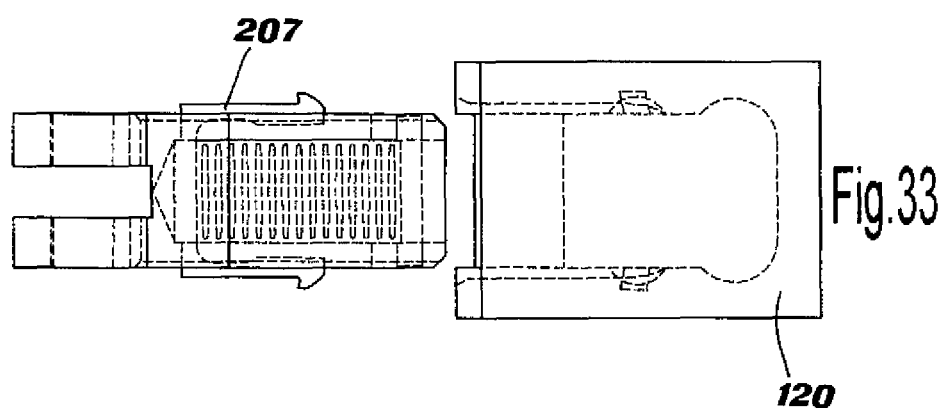
Figure 34:
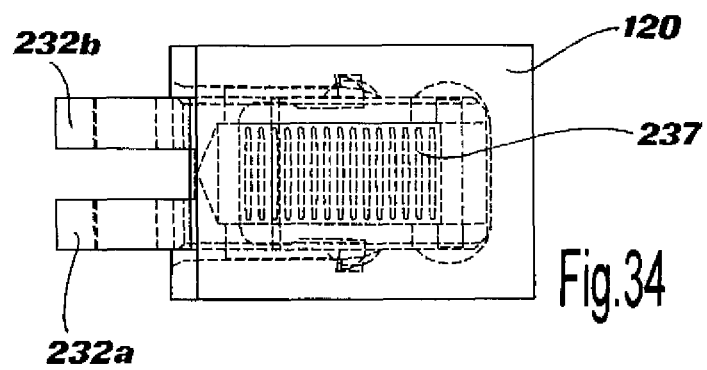
FIG. 34 is a top plan view, partially transparent, of the assembled hinge element according to the seventh embodiment.

FIGS. 27 and 28 illustrate a sixth embodiment of the invention, which is equivalent to the fourth embodiment. In this case, instead of the Seeger ring 223, a simple transverse rod 224 was provided to lock the end of the spring 204. The rod 224 is inserted through the longitudinal recess 222, close to its opening, immediately after the spring 204 has been inserted.

FIGS. 29-34 illustrate a seventh embodiment of the invention.

The hinge element that is illustrated here has a width that is greater than that of the hinge elements illustrated above, because it accommodates a pair of links 232a and 232b.

The slide body 231 has a width on the order of double its height. It has an essentially rectangular prismatic box-like shape. The two links 232a and 232b, parallel to one another, with a higher profile than the body 231 and connected to the latter by a trapezoidal connector portion 233, extend at the proximal end of said box.

As the figures show, the box 120 is essentially the same as the one that is illustrated in the preceding embodiments, except that it is wider. It has two opposing longitudinal grooves 121a and 121b for guiding the arms of the clip, and two transverse hollows for hooking the lugs of the clip.

According to the illustrated embodiment, the recess for housing the elastic piece 237 is produced in a rectangular shape and is open on two sides by the slots 206 and at the back by an opening 234. In addition, a transverse hole 235 is provided for the insertion of a locking rod 236 of the elastic piece.

The elastic piece 237 that is illustrated in FIG. 29 is in the form of a rectangular loaf made of elastic material, such as solid or alveolar elastomer or natural rubber. Advantageously, the width of the loaf is equal to the inside width of the base of the clip 207, which connects the two arms of the latter, whereby the clip here is U-shaped. In FIG. 29, it is noted that the base of the clip 207 has a small triangular projection 207' on the bottom that makes it possible to center and to hold the clip 207 in position inside the cavity of the slide.

FIGS. 35-37 illustrate an eighth embodiment of the invention that is similar to the seventh.

In this embodiment, the elastic piece consists of a pair of springs 241 and 242 that are arranged side by side inside the cavity of the slide body 231. In the same way, the cavity for accommodating the two springs 241, 242 is produced in the form of two adjacent longitudinal, circular channels 234'.

Figure 40:
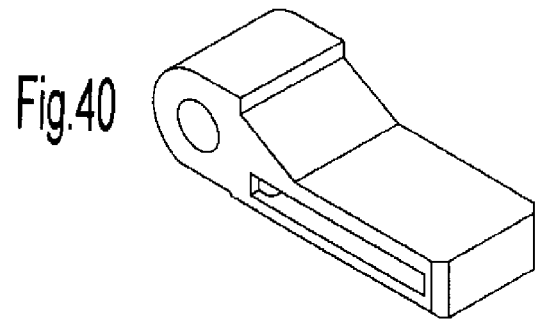
FIGS. 38-40 are views that correspond to FIGS. 29-31 of a ninth embodiment of the invention.
Figure 39:
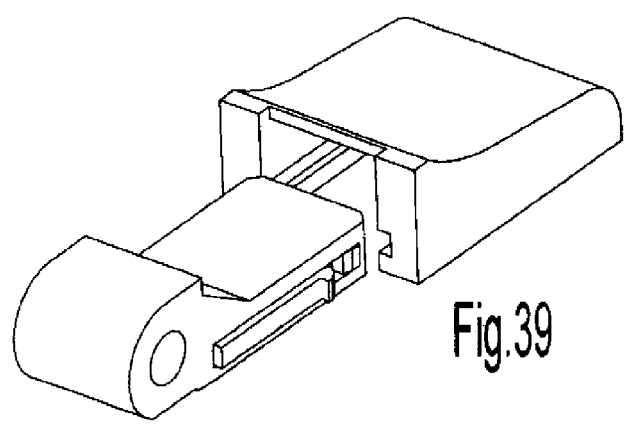
Figure 38:
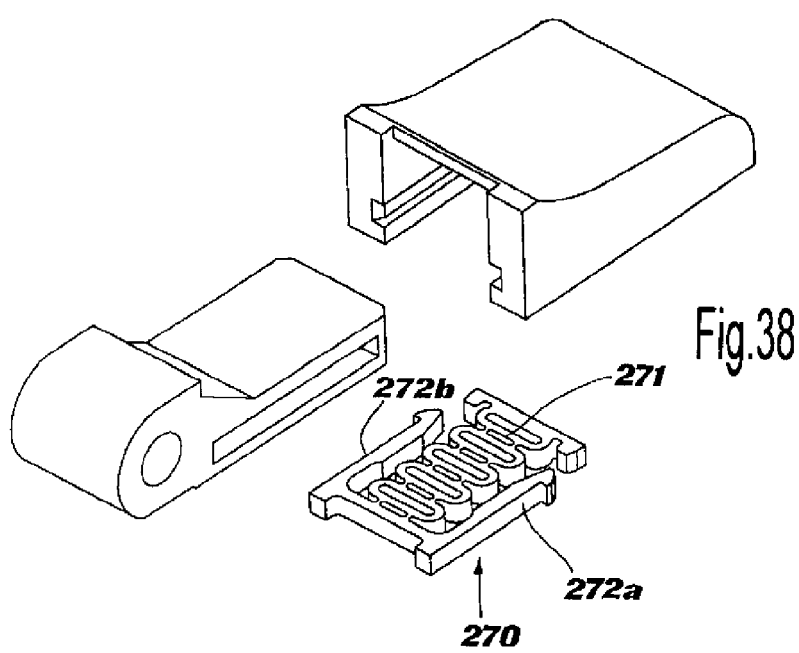

FIGS. 38-40 illustrate a ninth embodiment of the invention that is equivalent to that of the seventh embodiment.

In this embodiment, however, the elastic piece 271 and the U-shaped arm clip 270 are integral with one another and are optionally produced from a single piece.

The receiving cavity in the slide body can be easily produced during the molding as a transverse pocket, open on only two sides of the slide. The clip 270 can then be inserted transversally into the slide after having optionally lightly compressed the portion of the elastic piece 271 to better lock the clip in position: for this purpose, the total length of the clip 270 is greater than the length of the inside cavity of the slide.

The elastic portion 271 can be produced in a single piece with the two arms 272a and 272b; for example, it can be cut out into a metal plate. To increase the elasticity of the portion 271, the latter can have a suitable design with handles, as illustrated in FIG. 38.

Figure 41:
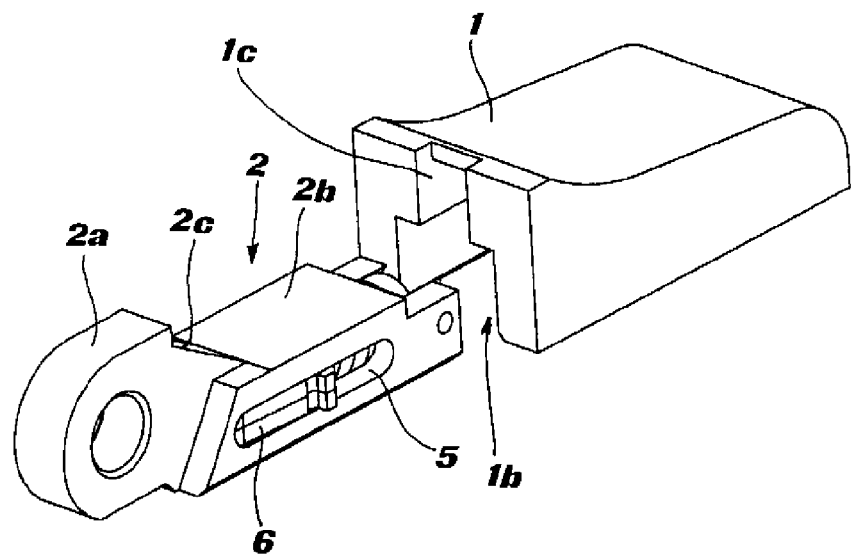
FIG. 41 is a perspective view of the upper lateral portion of the box and the movable slide of the hinge according to another embodiment of the invention, with a traction clip.

In FIG. 41, in a conventional manner, there are provided, on the one hand, a box housing 1—designed to be soldered, for example, on a glasses arm—and, on the other hand, an element with a movable slide 2 with an eyelet head 2a. The latter is designed to be mounted—by means of an axis of articulation (not shown)—on a female-U-shaped element of another hinge component.

Figure 42:
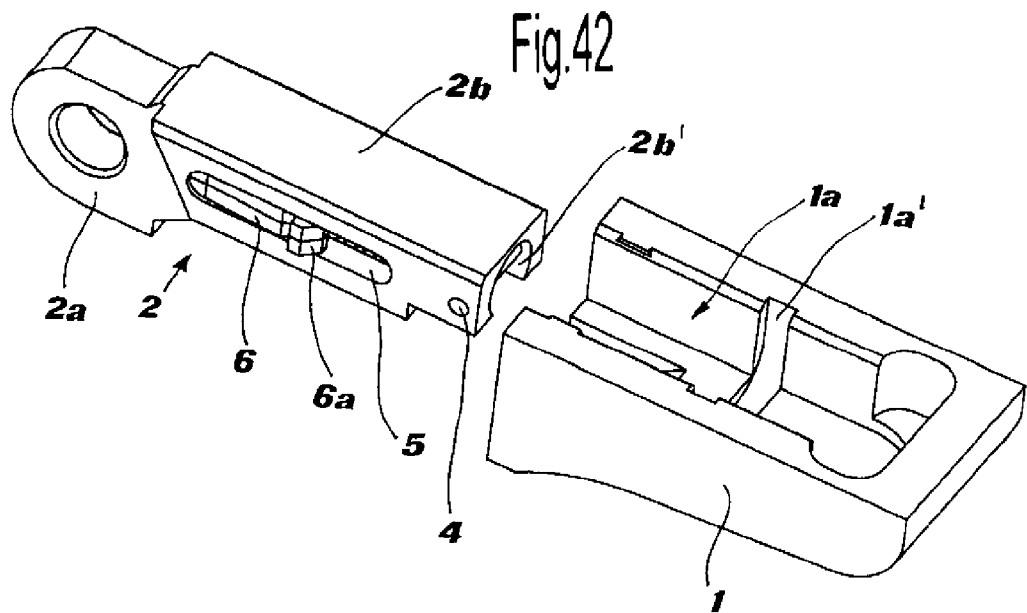
FIG. 42 is a lower lateral perspective view of the box and the movable slide of FIG. 41.
Figure 45:
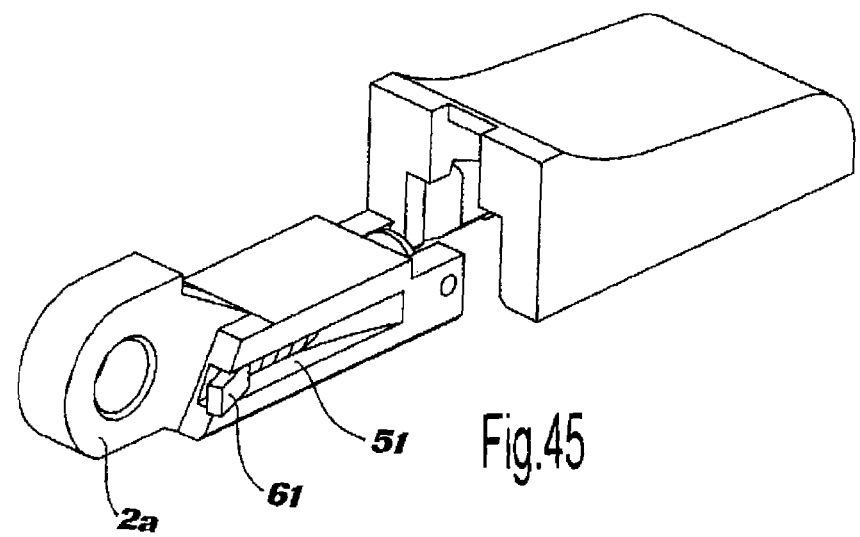
Figure 46:
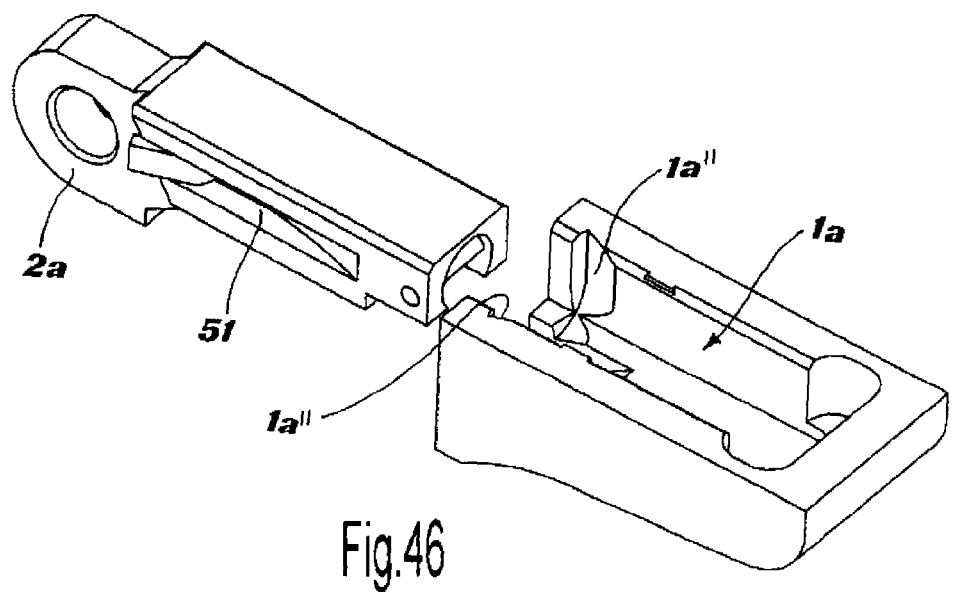
Figure 49:
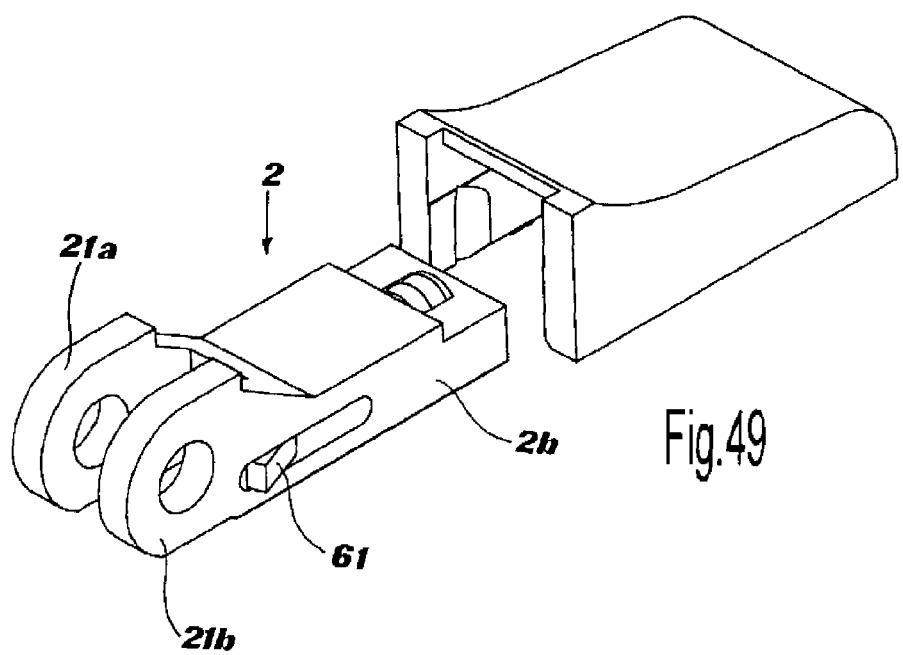
Figure 50:
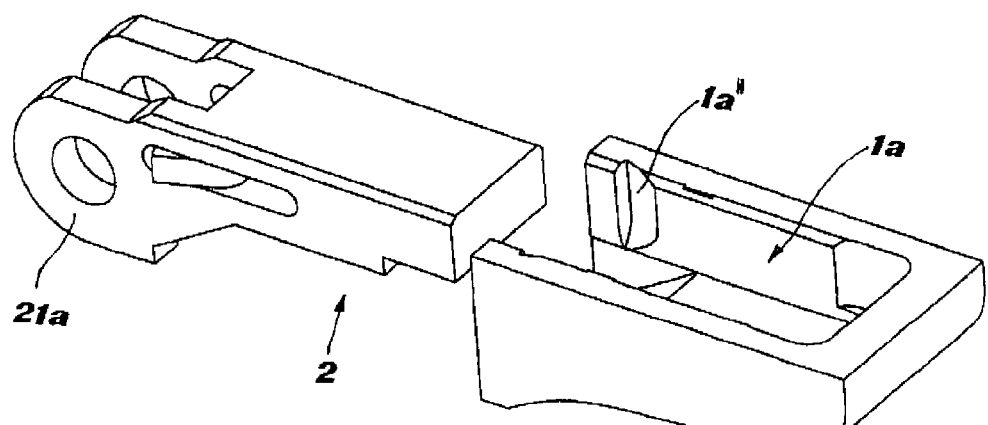

The box 1 has a recess 1a in which the slide 2 will be housed to move in length. In FIGS. 41-57, the box is shown open on the lower side (see, for example, FIG. 42): before the assembly of the hinge on the frame of the glasses, the lower side is normally closed by a closing strip (not shown).

According to the known technique, the slide 2 is designed in such a way that the height of the eyelet head exceeds the remaining portion of the body 2b. This implies in particular that the box 1 has a reduced predominant height—at the location in which it receives the cavity 1a—while near the mouth 1b of the cavity 1a, it has a greater height so as to be able also to accommodate at least partially the eyelet head 2a, optionally in a specially provided hollow 1c that is produced on the front of the housing 1. The cavity 1c that is to partially accommodate the eyelet head 2a most often has an inclined top 1c' against which an inclined upper stop 2b of the eyelet head 2a can rest.

According to the embodiment of FIGS. 41-57, the body portion 2b has a prismatic box-like shape.

In the illustrated version in FIGS. 41-44B, the body portion 2b of the slide 2 is essentially a rectangular parallelepiped with a width that is even greater than that of the eyelet head 2a. In addition, it is equipped with an inside cylindrical cavity 2b' for accommodating an elastic piece 3 in the form of a helical spring. The dimensions of the inside recess 2b' make it possible to accommodate the elastic piece 3 with precision. The length of the cavity 2b' parallel to the longitudinal sliding axis of the slide 2 extends over the entire length of the body portion 2b up to the connection with the eyelet head.

To advantageously lock the spring 3 in the cavity 2b' of the slide 2 in a suitable manner, two holes 4 and two openings or slots 5 are provided on the body 2b on the two opposing sides. A peg or a pin (not shown) can be inserted into the two holes 4 to constitute a stop element for the more internal or distal end of the spring 3. The two openings 5, which extend in the sliding direction, make it possible to insert an elastic clip in the form of a U-shaped foot 6: this clip 6 is mounted, as FIG. 44A illustrates, with the base oriented toward the eyelet head 2c and the two arms rotated toward the distal end of the slide. The two arms remain in the radius of the slide 2 and extend from the openings 5 with the respective holding catches 6a that have a bevel whose usefulness will be explained below.

The length of the lateral openings 5 is at least greater than the length of the arms of the U-shaped foot 6 in such a way as to be able to be mounted inside the cavity 2b'. In reality, the length of the openings 5 is even greater to also allow a longitudinal movement of the slide relative to the U-shaped clip at 6 that remains locked—once the hinge is assembled—in the hollows 1a' of the housing 1, as described below. In particular, the openings 5 are designed in such a way as to allow a relative movement between the slide 2 and the clip 6 of approximately 2-4 mm, travel that makes it possible to exploit the elasticity of the spring 3 and consequently the effectiveness of the flex hinge.

Since the body portion 2b has a box-like shape that is essentially closed, except for the holes 4 and the oblong openings 5, for inserting the helical spring 3, it is provided that the inside recess 2b' opens toward the outside of the sliding body using a terminal output, at the distal end.

Consequently, during the mounting phase, first the clip 6 is mounted in the slide 2, and then, through the terminal outlet, the spring 3, which is locked by inserting a peg into the holes 4, is inserted. In this way, it is possible to assemble a complete and independent slide 2 without using other components that should be mounted in the housing 1.

To finish mounting the hinge, it is sufficient to place the complete slide in the cavity 1a through the opening 1b. This operation can also be carried out advantageously after having soldered the housing 1 to the arm of the glasses. During this insertion phase, the slide 2 moves until the holding catches 6a enter into contact with the walls of the opening 1b. Since the catches 6a have a bevel, it is sufficient to exert a greater pressure to overcome the elastic thrust of the arms of the clip 6, whose fork tends to close, and to thrust the catches into the opening 5. The slide can therefore be pushed to the bottom. After having inserted the slide 2 completely into the cavity 1*a* (FIG. 44B), the holding catches 6*a* can extend again—by being inserted into the transverse cavity 1*a*' that is produced in the walls of the cavity 1*a*—pushed by the elasticity of the arms of the clip 6 whose fork tends to reopen elastically. The coupling of the holding catches 6*a* in the cavity 1*a*' then prevents the slide from extending from the housing 1, because their shape does not make it possible for the arm of the clip 6 to bend again. Accordingly, this type of clip is of the traction type because the extraction of the slide from the housing 1 is hindered by the clip—which acts on the spring 3—whose arms work by traction.

Consequently, it is possible to obtain a stable assembly in an automatic way.

FIGS. 45-48B show a hinge that is analogous to that of FIGS. 41-44B with, by contrast, a clip of the compression type. Actually, in this case, a U-shaped clip with slightly divergent arms that are rotated toward the eyelet head 2*a* is inserted into the opposing openings 51. Accordingly, the cavity 1*a* of the housing 1 has two opposing cavities 1*a*", close to the mouth 1*b*, equipped with an inclined side that can accommodate the lateral edges of the arms that are detached from the U-shaped clip 61 and a shoulder, perpendicular to the sliding axis, which serves as a stop to the ends of said arms.

The assembly is analogous to the one already presented. With the insertion of the slide 2 into the sliding cavity 1*a*, the arms of the clip 61 reclose elastically to reopen once they have gone beyond the shoulders of the hollows 1*a*". The ends of the clip 61 are then supported on the shoulders of the hollows 1*a*" during the extraction of the slide 2 that is in opposition to the spring 3.

FIGS. 49-52B show another version of the hinge according to the invention, quite similar to that of FIGS. 45-48B but that has a double eyelet head 21*a* and 21*b*. In this case, the width of the slide 2 can be slightly greater than that illustrated in FIGS. 41-48B in such a way as to have two separate eyelet heads 21*a* and 21*b* that extend from the same slide body 2*b*.

Preferably, and contrary to the versions described above, the outside walls of the two heads 21*a* and 21*b* are aligned with the walls of the body portion 2*b* of the slide 2.

Figure 53:
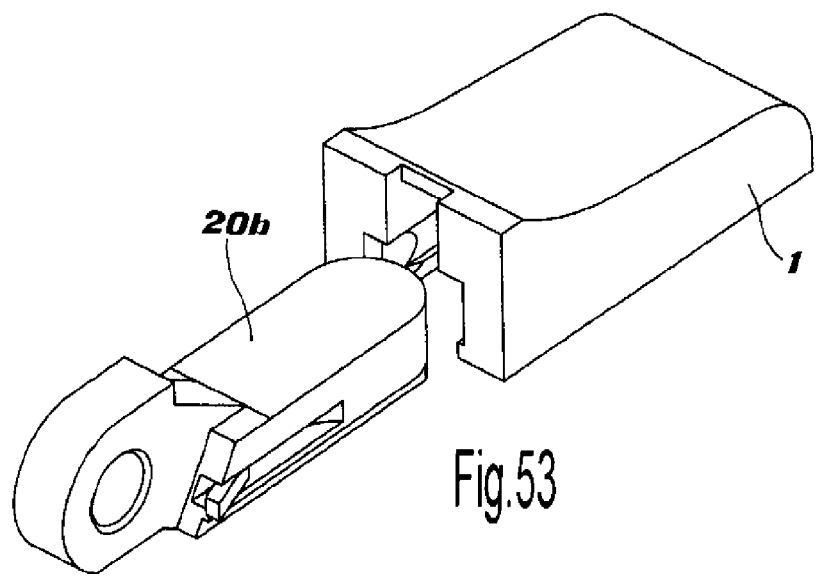
Figure 54:
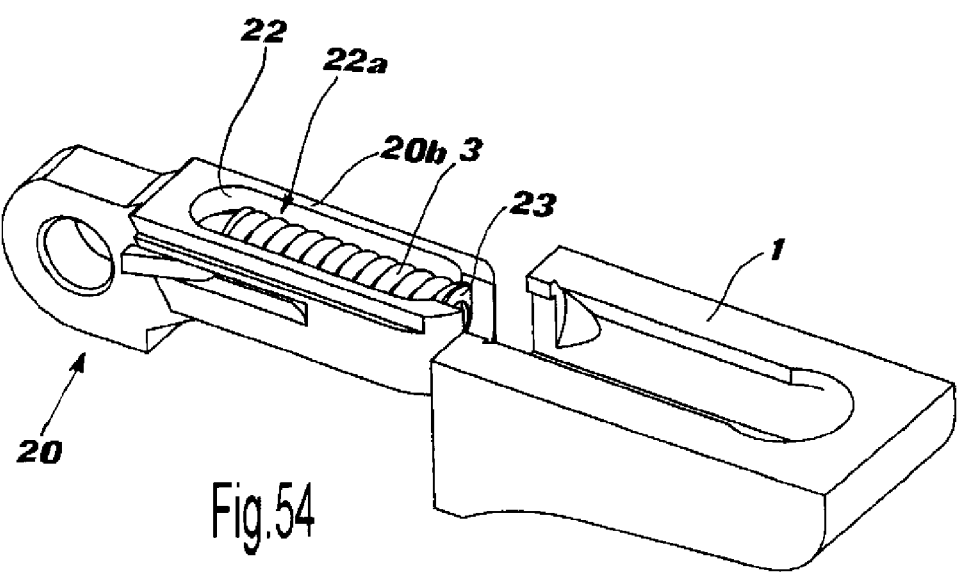

Finally, FIGS. 53-56B show a hinge in which the body portion 20*b* of the slide 20 also has an opening 22 on the lower surface or at the bottom, as FIG. 54 well illustrates. In this case, the terminal opening of the distal end can also be very small or may not be present at all because the helical spring 3 is designed to be inserted transversally into the cavity of the slide using the opening 22.

The installation of a holding ring 23, such as a Seeger ring, is provided for locking the distal end of the spring 3 in the case where the slide would have a terminal opening.

As illustrated in FIG. 53, the body portion 20*b* of the box slide 20 is always prismatic, but the distal end can be curved.

FIGS. 57A and 57B show the detail of an illustrative compression clip 600. This clip 600 has a body 601 from which two detached arms 600*a* and 600*b* extend. The connection body 601 is rounded in the direction in which the arms extend, while it has a small projection 602 from the opposite side, on the axis of symmetry.

The projection 602 serves to better hold the helical spring 3 in position.

In contrast, the rounded part of the connection body 601 is to conform in shape to the corresponding rounded profile of the proximal end (i.e., close to the eyelet head) of the cavity 22*a* of the housing of the spring 3. More specifically, in the case where the box cavity 22*a* and the corresponding opening 22 would be produced with a single longitudinal milling in the body portion 20*b*, the two ends would prove necessarily rounded (of the same radius as that of the cutter that is used): by opportunely selecting the rounding radius of the connection body 601, it is possible to adjust it to the curvature of the proximal end of the cavity 22 in favor of the coupling stability when the slide is completely inserted into the box housing (FIGS. 55B and 56B).

The singular dimensioning of the slide body along with the particular box configuration of the invention also make it possible to produce this type of slide with plastic materials while preserving adequate strength of the device in the repeated fraction cycles.

As an alternative, the same slide can also be obtained with the MIM ("Metal Injection Molding") technology.

In this case, the recess and the outlet slots of the clip can be produced directly during the molding phase instead of by milling with removal of material.

As the preceding description clearly shows, embodiments of slides according to the invention can be compact, solid and resistant. The particular conformation of the slide body with a recess and lateral openings for the extension of the guiding arms is easy to produce economically with technological manufacturing processes; for example, a series of milling cycles of a heavy metal piece makes it possible to easily obtain the slide of the invention.

The special prismatic shape with the inside recess and lateral openings is easy to produce economically with technical machining processes; for example, a series of milling cycles on a solid piece of metal makes it possible to easily obtain the slide model.

Furthermore, the inherent solidity of this configuration makes it possible to manufacture said components not only with machine-manufactured metal materials but also, for example, with technical processes for injection of plastic material or metal powders (MIM).

Using the solution described here, it is possible to reach the objectives disclosed above, with numerous advantages.

The slide comprises a recess that contains the elongated elastic piece in nearly complete form, except on one insertion side. In this way, the elastic piece is held well and locked well and consequently, even if it is very elongated, it does not have problems of deformation or poor operation. This makes it possible, as has been clearly demonstrated, also to use elastic pieces of another type and not necessarily a helical spring made of metal. Although this is not expressly described, it is also possible to consider injecting elastomer material directly into the recess of the slide after having inserted there a holding clip of suitable shape (for example, equipped with a small piston acting on the elastomer mass): an elastomer material does not pose any problem linked to the infiltrations of water.

Since the body of the slide is arranged around the elastic piece and not in its core (as is the case with the traditional slides with support rods), there is more mass and more moment of inertia available, which advantageously contributes to increasing the strength in the traction and the torque exerted on the articulation of the glasses arms.

The prismatic shape of the slide body is particularly economical to produce, even in the case of machine manufacturing, and it makes it possible to produce precise sliding planes that, with the increase of rigidity, improve the guiding into the box.

In particular, the rectangular prism does not exhibit less than four sliding surfaces that, especially along the four edges, are able to guide the slide into the housing in an excellent way. Since the elastic is completely contained in the body portion of the slide, there is no portion of the slide that is not available for the guiding function, and, consequently, the longest guiding length possible is obtained.

For the same pattern, providing more than one elastic piece in the slide to improve the reliability and the operation of the hinges, for example two helical springs side by side, does not create particular complications.

The possibility of assembling the elastic piece in a stable manner in the slide, using the clip and the optional end stop element (pin or Seeger 23), simplifies the handling of pieces during the final assembly phase of the slide in the housing, which can be done automatically.

The clips can be easily inserted through the elongated openings on two opposing sides. The presence of the end lugs with a mushroom-cap top ensures an effective locking of the clip in the box, while ensuring a predefined end-of-travel of the slide, which represents another advantage in terms of the service life of the elastic piece that always operates at its higher level.

The arms of the clip, which partially emerge from the slide body, are held with precision in the longitudinal grooves of the box; in addition, the lateral slots of the slide body are designed to slide with precision on said arms. This produces not only an excellent longitudinal guiding of the slide but also an anti-rotational effect.

The thus produced anti-rotational function is particularly effective because the anti-rotational torque is produced in positions that are removed from the central axis, as well as on guide grooves that are quite wide and deep (owing to the thinness—such as, for example, 0.6 mm—of the clip); this makes it possible to obtain minimum play without significant dimensional tolerance problems. Advantageously, the anti-rotational function makes it possible also to adopt a cylindrical slide body, which simplifies the production of a box that can even be directly produced in the glasses arm, in certain embodiments.

The guiding along the longitudinal grooves of the box does not require a slide in the lower part of the box, which prevents any contact of the slide with the support of the hinge element (for example a glasses arm) and increases the assembly simplicity (soldering) of the hinge element on its support.

The clips can be easily inserted owing to the oblong openings of the two opposing sides. It is possible to use either a compression clip or a traction clip. The latter offers the advantage of better centering the anchoring point over the length of the box body; this better balances the forces and does not create any obstacles to the uniform distribution of four soldering points on the profile of the perimeter of the housing.

Finally, the central position of the holding lugs of the clip increases the freedom of choice of the soldering points and reduces to a minimum the total length of the hinge element.

The invention claimed is:

1. An elastic hinge element for a glasses frame comprising:
a box (100) having an end face;
a guiding cavity (101) located within the box (100), the guiding cavity beginning at the end face and having a length;
a slide (200) that comprises
i) a slide body (221) located within the guiding cavity (101) and movable along the length of the guiding cavity (101), the slide body having a prismatic elongated box shape comprising a top, a bottom opposite the top, two opposing sides that extend from the bottom to the top, and a distal end,
ii) an inside cavity (222) in a form of a longitudinal recess within the slide body (221),
iii) two slots (206) on external surfaces of the two opposing sides of the slide body (221), one of the two slots on each of the two opposing sides, each slot (206) having a height in a first direction between the bottom and the top of the slide body and a length in a longitudinal direction of the slide body, and
iv) an end aperture in the distal end of the slide body (221), the end aperture having an diameter;
at least one elastic piece (204) disposed and held within the inside cavity (222), the at least one elastic piece (204) having a proximal end and a distal end and an outside diameter, wherein the diameter of the end aperture is greater than the outside diameter of the at least one elastic piece such that the end aperture is sufficiently large to longitudinally insert the at least one elastic piece through the end aperture, and the height of each slot (206) is less than the outside diameter of the elastic piece (204); and
a holding clip (207) comprising
i) flexible arms (401, 402) engaged in the slots (206) of the slide body (221), and
ii) means for holding (207a, 207b) located at a distal end of each of the flexible arms, wherein,
the proximal end of the elastic piece bears against the holding clip, and the means for holding (207a, 207b) locks the holding clip (207) and the proximal end of the elastic piece relative to the box (100) such that the at least one elastic piece (204) produces an elastic reaction opposing extraction and preventing complete extraction of the slide (200) from the guiding cavity (101),
a stop element (224) that locks the distal end of the at least one elastic piece within the inside cavity,
wherein the distal end of the at least one elastic piece (204) rests against the stop element (224) to thereby hold the at least one elastic piece within the cavity.

2. An elastic hinge element for a glasses frame comprising:
a box (100) comprising an end face,
a guiding cavity (101) located within the box (100), the guiding cavity beginning at the end face,
a slide (200) that comprises a slide body (221) with a distal end and an inside cavity (222) in a form of a longitudinal recess, the slide body (221) having a prismatic elongated box shape comprising a top, a bottom opposite the top, two opposing sides that extend from the bottom to the top, and two slots (206) on external surfaces of the two opposing sides, one of the two slots on each of the two opposing sides of the slide body, the slide body being located within the guiding cavity (101) and movable along a length of the guiding cavity (101), each slot having a height in a first direction between the bottom and the top of the slide body and a length in a longitudinal direction of the slide body,
at least one elastic piece (204) disposed and held within the inside cavity (222) of the slide body (221), the at least one elastic piece (204) having a proximal end and a distal end,
an end aperture in the distal end of the slide body (221), the end aperture having an diameter greater than an outside diameter of the at least one elastic piece such that the end aperture is sufficiently large to longitudinally insert the at least one elastic piece therethrough, and
a holding clip (207) comprising i) flexible arms (401, 402) that extend in a distal direction towards the distal end of the elastic piece and ii) means for holding (207a, 207b) located at a distal end of the flexible arms, wherein, the flexible arms are engaged in the slots (206) of the slide body (221), and the proximal end of the at least one elastic piece bearing against the holding clip, the means for holding (207a, 207b) locks the holding clip (207) and the proximal end of the elastic piece relative to the box (100) such that the elastic piece (204) produces an elastic reaction opposing extraction and preventing complete extraction of the slide (200) from the guiding cavity (101), the means for holding (207a, 207b) located at the distal end of the flexible arms are holding lugs, and the height of each slot (206) is less than the outside diameter of the at least one elastic piece (204), a stop element (224) that locks the distal end of the at least one elastic piece within the inside cavity, wherein the distal end of the at least one elastic piece (204) rests against the stop element (224) to thereby hold the at least one elastic piece within the inside cavity.

3. The hinge element as in claim 2, wherein the slide comprises a pierced link (202) for articulation with a hinge end piece, and the flexible arms of the holding clip extending in the direction opposite the pierced link (202) such that a proximal end of the flexible arms is near the pierced link (202) and the distal end of the flexible arms is remote from the pierced link (202).

4. The hinge element according to claim 3, wherein, the box (100) comprises walls and a transverse recess (102a, 102b) in each of the walls, each transverse recess (102a, 102b) facing the guiding cavity (101), and the means for holding comprise lugs (207a, 207b) compression fitted into the transverse recesses (102a, 102b) to lock the holding clip (207) relative to the box (100).

5. The hinge element according to claim 2, wherein the holding clip has essentially an H shape.

6. The hinge element according to claim 2, wherein, the guiding cavity (101) comprises walls, and the walls of the guiding cavity (101) comprise two opposing longitudinal grooves (103a, 103b) that extend from the end face along the walls of the guiding cavity, and the flexible arms of the holding clip are engaged in the longitudinal grooves of the guiding cavity, the slide body being movable along the length of the guiding cavity by the flexible arms of the holding clip being movable along the longitudinal grooves of the guiding cavity.

7. The hinge element according to claim 6, wherein a length of the two slots (206) of the slide body is greater than a length of the flexible arms of the holding clip.

8. The hinge element according to claim 2, wherein, the box (100) comprises walls and a transverse recess (102a, 102b) in each of the walls, each transverse recess (102a, 102b) facing the guiding cavity (101), and the means for holding comprise lugs (207a, 207b) that are arranged on the flexible arms and that are fitted into the transverse recesses (102a, 102b) to thereby lock the holding clip (207) relative to the box (100).

9. The hinge element according to claim 8, wherein the lugs comprising a surface defining an anchoring angle (403), the anchoring angle hooked to a surface of a corresponding one of the transverse recesses to thereby lock the holding clip (207) relative to the box (100).

10. The hinge element according to claim 8, wherein, the slots (206) of the slide body comprise end portions (206'), and the lugs (207a, 207b) each further comprise an inclined surface serving as an end-of-travel stop and resting on the end portions (206') of slots (206), the inclined surface locking the lugs by compression in the transverse recesses of each of the walls of the guiding cavity (101).

11. The hinge element according to claim 8, wherein, the slots (206) of the slide body comprise end portions (206'), and the lugs (207a, 207b) engage the end portions (206') of slots (206) shaped to transform a longitudinal traction on the slide into a pressure action of the lugs toward the respective transverse recesses of each of the walls of the guiding cavity (101).

12. The hinge element according to claim 2, wherein the clip (207) is made of thin metal plate.

13. The hinge element according to claim 2, wherein the clip has essentially a U shape.

14. The hinge element according to claim 2, wherein the holding clip holds the slide in the box (100) to allow an assembled delivery of the hinge element before mounting the hinge element on a support.

15. The hinge element according to claim 2, wherein the slide body has a width that is at least double a height of the slide body.

16. The hinge element according to claim 2, wherein the slide body is made of polymer material.

17. The hinge element according to claim 2, wherein the slide comprises at least one pierced link (202) for articulation with a hinge end piece.

18. The hinge element according to claim 2, wherein the elastic piece (204) comprises a helical spring.

19. The hinge element according to claim 2, wherein the distal end of the elastic piece rests on a part of the distal end of the slide body.

20. The hinge element according to claim 2, further comprising:

a rod (224) extending between the two sides of the slide body and the inside cavity (222) of the slide body, wherein, the distal end of the at least one elastic piece (204) rests against the rod (224) to thereby hold the at least one elastic piece within the inside cavity.

21. The hinge element according to claim 2, wherein said two slots (206) open to said inside cavity (22).

22. The hinge element as in claim 21, wherein said two slots (206) have a sufficient length to allow insertion of the holding clip in the inside cavity of the slide body of the slide.

23. The hinge element as in claim 21, wherein, the slide comprises a pierced link (202) for articulation with a hinge end piece, and said holding clip is arranged with the flexible arms extending in the direction opposite the pierced link (202) which arms fit into the transverse recesses, under longitudinal traction force, lock the proximal end of the at least one elastic piece relative to the box.

24. The hinge element as in claim 21, wherein the slide comprises a pierced link (202) for articulation with a hinge end piece, and wherein said holding clip is the form of a U-shaped foot that is arranged with the flexible arms extending in a direction away from the pierced link (202).

25. The hinge element as in claim 2, further comprising a stop element (224) at the distal end of said slide body, the stop element acting against the distal end of the at least one elastic piece, wherein the distal end of the at least one elastic piece (204) rests against the stop element (224) to thereby hold the at least one elastic piece within the inside cavity.

26. The hinge element as in claim 2, wherein the slide body (221) is a unitary structure.

* * * * *